United States Patent
Sachs

(10) Patent No.: US 11,082,544 B2
(45) Date of Patent: Aug. 3, 2021

(54) COMPACT TIMESTAMP, ENCODERS AND DECODERS THAT IMPLEMENT THE SAME, AND RELATED DEVICES, SYSTEMS AND METHODS

(71) Applicant: Microchip Technology Incorporated, Chandler, AZ (US)

(72) Inventor: Jason Sachs, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 94 days.

(21) Appl. No.: 16/169,501

(22) Filed: Oct. 24, 2018

(65) Prior Publication Data

US 2019/0281144 A1 Sep. 12, 2019

Related U.S. Application Data

(60) Provisional application No. 62/641,112, filed on Mar. 9, 2018.

(51) Int. Cl.
| | | |
|---|---|---|
| *H04J 3/06* | (2006.01) | |
| *H04Q 9/00* | (2006.01) | |
| *H04L 29/06* | (2006.01) | |
| *H03M 13/35* | (2006.01) | |
| *H03M 13/37* | (2006.01) | |
| *H03M 13/25* | (2006.01) | |
| *G06F 7/58* | (2006.01) | |

(52) U.S. Cl.
CPC ............ *H04L 69/28* (2013.01); *H03M 13/25* (2013.01); *H03M 13/35* (2013.01); *H03M 13/373* (2013.01); *H04J 3/067* (2013.01); *H04L 63/123* (2013.01); *H04Q 9/00* (2013.01); *G06F 7/584* (2013.01); *H04L 2463/121* (2013.01)

(58) Field of Classification Search
CPC ..... G06F 1/04; G06F 1/10; G06F 1/12; G06F 1/14; G06F 7/584; H04L 69/28; H04L 63/123; H04L 2463/121; H03M 13/25; H03M 13/35; H03M 13/373; H04J 3/067; H04J 3/123
USPC ......................................................... 713/400
See application file for complete search history.

(56) References Cited

U.S. PATENT DOCUMENTS

| | | | | |
|---|---|---|---|---|
| 4,825,397 A | * | 4/1989 | Muller .................... | G06F 7/584 708/320 |
| 6,535,925 B1 | * | 3/2003 | Svanbro .................. | H04L 65/80 341/60 |
| 6,680,921 B1 | | 1/2004 | Svanbro et al. | |
| 6,680,955 B1 | * | 1/2004 | Le ........................... | H04L 29/06 370/477 |
| 6,760,764 B1 | * | 7/2004 | Driediger .................. | G06F 1/14 709/204 |

(Continued)

OTHER PUBLICATIONS

International Written Opinion for International Application No. PCT/US2019/021010, dated Jun. 3, 2019, 10 pages.

(Continued)

*Primary Examiner* — Brian T Misiura
(74) *Attorney, Agent, or Firm* — TraskBritt

(57) ABSTRACT

Compact timestamps and related methods, systems and devices are described. An encoder is configured to generate compact timestamps of the disclosure by sampling states of linear feedback shift registers (LFSRs). A decoder may be configured to determine timing information responsive to the compact timestamps.

37 Claims, 15 Drawing Sheets

(56) References Cited

U.S. PATENT DOCUMENTS

| | | | |
|---|---|---|---|
| 7,428,681 B2* | 9/2008 | Kang | G01R 31/318536 714/738 |
| 9,930,422 B2* | 3/2018 | Mizoguchi | H04N 21/631 |
| 2010/0287402 A1 | 11/2010 | Kim et al. | |
| 2014/0260638 A1 | 9/2014 | Hood et al. | |
| 2017/0091014 A1 | 6/2017 | Bressanelli et al. | |

OTHER PUBLICATIONS

International Search Report for International Application No. PCT/US2019/021010, dated Jun. 3, 2019, 6 pages.

* cited by examiner (State of the Art)

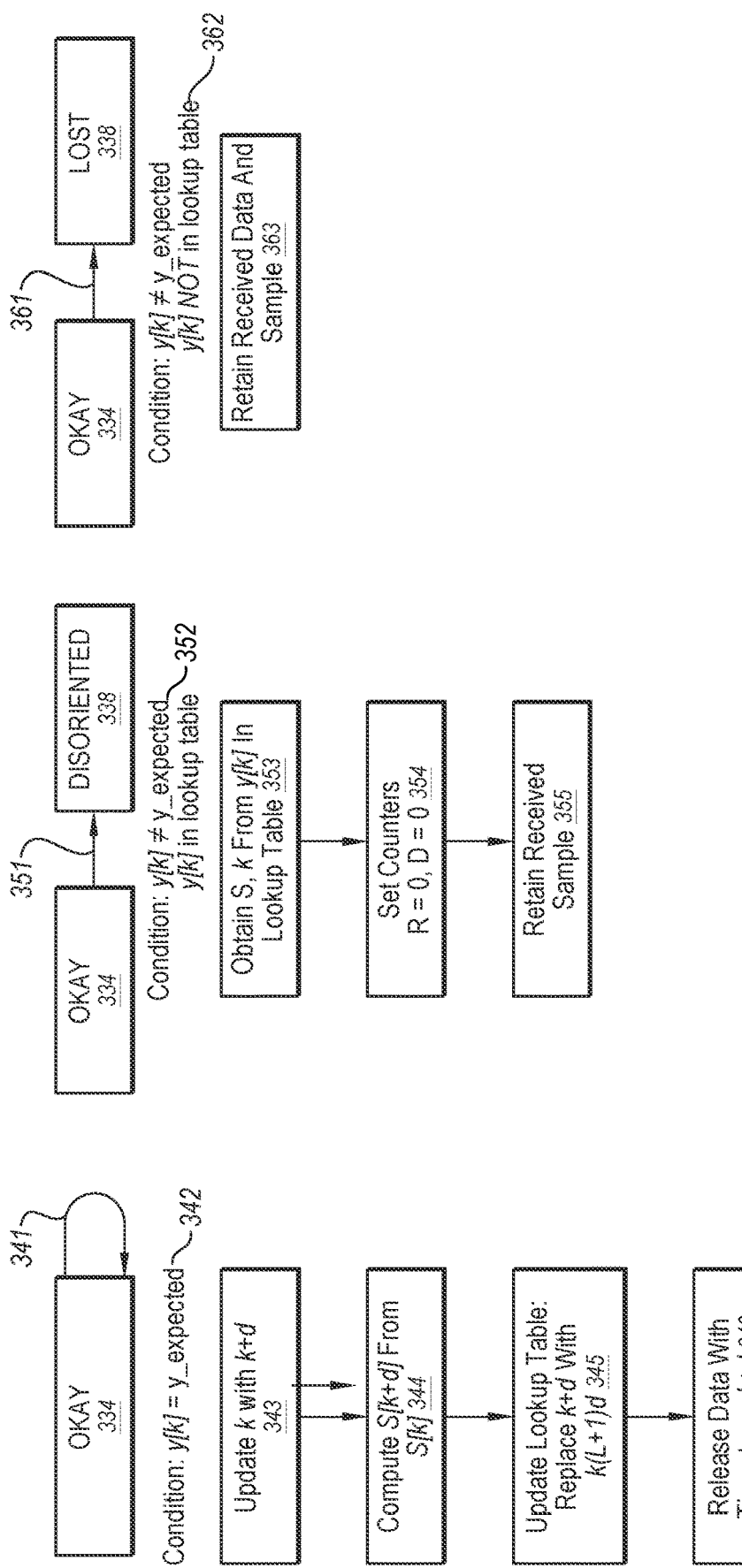

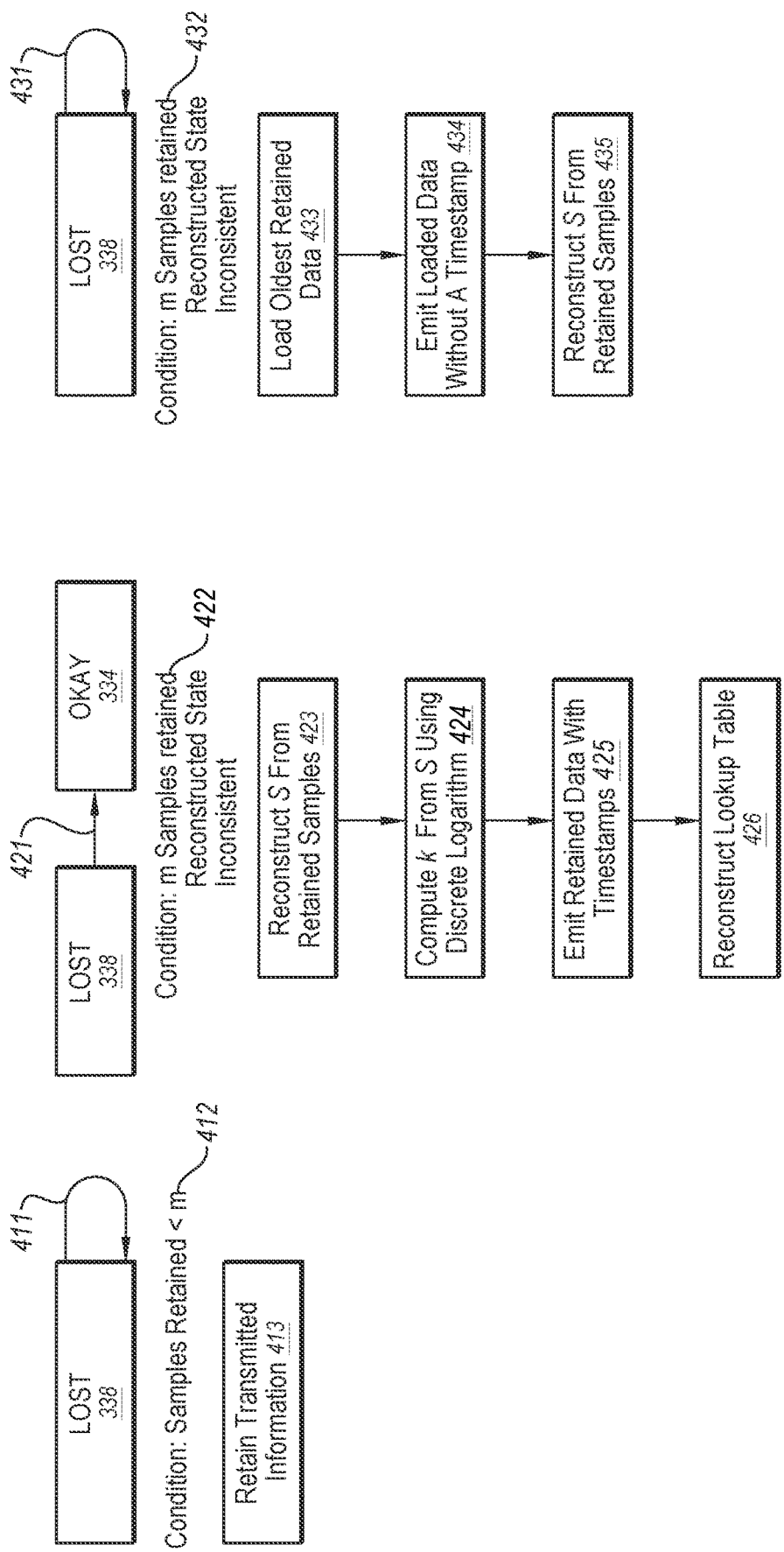

| $k$ | $k_m$ | $\Delta k$ | $S$ | $y$ | $S_r$ | $k_r$ | Match |
|---|---|---|---|---|---|---|---|
| 299999999999004 | 0 | | 0001 | 01 | | | False |
| 299999999999004 | 16 | 16 | 1699 | 70 | 1699 | 16 | True |
| 299999999999004 | 32 | 16 | 0704 | 74 | 0704 | 32 | True |
| 299999999999004 | 48 | 16 | 0f16 | e7 | 0f16 | 48 | True |
| 299999999999004 | 64 | 16 | 15f5 | 0a | 15f5 | 64 | True |
| 299999999999004 | 80 | 16 | 145d | 18 | 145d | 80 | True |
| 299999999999004 | 90 | 16 | 0c3b | d8 | 0c3b | 90 | True |
| 299999999999004 | 112 | 16 | 08ff | d0 | 08ff | 112 | True |

| i | $k_m$ | $\Delta_m$ | y | State | S | Snext | When | $k_r$ |
|---|---|---|---|---|---|---|---|---|
| 21 | 2768 | 16 | c5 | OK | 0863 | 0def | 21 | 2768 |
| 22 | 2784 | 16 | 91 | OK | 0def | 0dd7 | 22 | 2784 |
| 23 | 2100 | 16 | 8a | OK | 0dd7 | 1e15 | 23 | 2800 |
| 24 | 2316 | 16 | f4 | OK | 1e15 | 08a0 | 24 | 2816 |
| 25 | 2832 | 16 | 8a | OK | 08a0 | 1f1a | 25 | 2832 |
| 26 | 2848 | 16 | eb | OK | 1f1a | 00da | 26 | 2848 |
| 27 | 2864 | 16 | 57 | OK | 00da | 1bcb | 27 | 2864 |
| 28 | 209 | 16 | 01 | LOST | 15fe | 1bcb | 31 | 209 |
| 29 | 225 | 16 | 6d | LOST | 037a | 1bcb | 31 | 225 |
| 30 | 241 | 16 | b6 | LOST | 1b06 | 1bcb | 31 | 241 |
| 31 | 257 | 16 | f2 | OK | 0b46 | 1a78 | 31 | 257 |
| 32 | 273 | 16 | ff | OK | 1a78 | 1430 | 32 | 273 |
| 33 | 289 | 16 | 53 | OK | 1430 | 12d6 | 33 | 289 |
| 34 | 305 | 2432 | 7b | OK | 12d6 | 1cd2 | 34 | 305 |
| 35 | 321 | 16 | 9f | OK | 1cd2 | 1e25 | 35 | 321 |
| 36 | 337 | 16 | e7 | OK | 1e25 | 11ff | 36 | 337 |
| 37 | 353 | 16 | 40 | OK | 11ff | 179e | 37 | 353 |
| 38 | 369 | 16 | 67 | OK | 179e | 05e3 | 38 | 369 |
| 39 | 385 | 32 | 1d | OK | 05e3 | 15f6 | 39 | 385 |
| 30 | 401 | 16 | 09 | OK | 15f6 | 09e7 | 30 | 401 |
| 41 | 417 | 16 | d9 | OK | 09e7 | 0537 | 41 | 417 |

476, 478, 480

| i | $k_m$ | $\Delta_m$ | y | State | S | Snext | When | $k_r$ |
|---|---|---|---|---|---|---|---|---|
| 0 | 0 |  | 01 | LOST | 0001 |  |  | 0 |
| 1 | 16 | 16 | 70 | LOST | 1699 |  | 3 | 16 |
| 2 | 32 | 16 | 74 | LOST | 0704 |  | 3 | 32 |
| 3 | 48 | 16 | e7 | OK | 0f16 | 15f5 | 3 | 48 |
| 4 | 64 | 16 | 0a | OK | 15f5 | 145d | 3 | 64 |
| 5 | 80 | 16 | 18 | OK | 145d | 0c3b | 4 | 80 |
| 6 | 96 | 16 | d8 | OK | 0c3b | 08ff | 5 | 96 |
| 7 | 112 | 16 | d0 | OK | 08ff | 138b | 6 | 112 |
| 8 | 128 | 16 | 33 | OK | 138b | 127b | 7 | 128 |
| 9 | 144 | 16 | 7c | OK | 127b | 0d70 | 8 | 144 |
| 10 | 166 | 16 | 87 | OK | 0d70 | 0e09 | 9 | 166 |
| 11 | 176 | 16 | e9 | OK | 0e09 | 08b5 | 10 | 176 |
| 12 | 2608 | 16 | 80 | LOST | 0c44 | 08b5 | 11 | 2608 |
| 13 | 2642 | 16 | 8b | LOST | 080b | 08b5 | 15 | 2642 |
| 14 | 2640 | 2432 | 60 | LOST | 13dd | 08b5 | 15 | 2640 |
| 15 | 2656 | 16 | 60 | OK | 02ee | 06e4 | 15 | 2656 |
| 16 | 2672 | 16 | 2a | OK | 06e4 | 0527 | 15 | 2672 |
| 17 | 2704 | 32 | 90 | DISO | 0cff | 11f6 | 16 | 2704 |
| 18 | 2720 | 16 | 49 | DISO | 11f6 | 069a | 20 | 2720 |
| 19 | 2736 | 16 | a3 | DISO | 069a | 1cd6 | 20 | 2736 |
| 20 | 2752 | 16 | 9b | OK | 1cd6 | 0863 | 20 | 2752 |

460, 462, 464, 466, 468, 470, 472, 474

COMPACT TIMESTAMP, ENCODERS AND DECODERS THAT IMPLEMENT THE SAME, AND RELATED DEVICES, SYSTEMS AND METHODS

CROSS-REFERENCE TO RELATED APPLICATION

This application claims the benefit under 35 U.S.C. § 119(e) of U.S. Provisional Patent Application Ser. No. 62/641,112 filed Mar. 9, 2018, the contents and disclosure of which is hereby incorporated herein in its entirety by this reference.

TECHNICAL FIELD

Embodiments of the disclosure relate, generally, to timestamps for data transmission, and more specifically, compact timestamps generated from linear feedback shift registers.

BACKGROUND

Accurate timestamping of transmitted data, e.g., transmitted from a source microcontroller or microprocessor to a target host, is a common task during data logging from the source to a host. In a regularly-sampled data system, such as a motor drive or battery charger, the system typically executes code in a control cycle at a fixed rate, and transmits samples of data used in a given control cycle (for example, voltages, currents, status flags, etc.), along with some association of in which control cycle—also known as the "tick count"—that data occurred.

Some data systems use a state of a linear feedback shift registers (LFSR) to encode and recover a count that may be used to determine timing data. For example, FIG. 1 shows 12-bit LFSRs 100 in a Galois configuration that consist of a series of shift register cells, each storing one bit. On each LFSR update cycle, each cell receives its input from the previous cell's contents, here, shifting from right to left. When the system is clocked, the contents of all cells are shifted-left. The bits that are in cells that are not taps are shifted one position to the left unchanged. The bits in cells that are taps are XOR'd with the bit in the last (i.e., the cell holding the most significant bit) cell 102 and the result is stored in the next position. The new bit in the last cell 102 is the next input bit for the XOR operations. The choice of whether or not to perform the XOR is dictated by the LFSR taps 104, 106 and 108, which correspond to the nonzero terms in the characteristic polynomial of the LFSR. For example, FIG. 1 shows a 12-bit LFSR 100 with characteristic polynomial $x^{12}+x^6+x^4+x+1$, which has a binary representation of "1000001010011."

LFSR 100 is characterized by a primitive polynomial that produces a maximal-length LFSR with period of $2^{12}-1=4095$, covering all values except for the all-zero pattern. If LFSR 100 is implemented on a sampled data system, with initial LFSR state of "000000000001" at tick count 0, and the LFSR state is sent to a host at any subsequent tick, the host can recover a tick count using a discrete logarithm computation based on the LFSR state. The larger the LFSR size, the longer the period. The LFSR 100 may be represented more compactly as LFSR 110, where the XOR gates are not shown before the taps. Notably, LFSR 100 and LFSR 110 are different representations of the same LFSR.

In a case where a data system transmits a single bit (e.g., the input bit in the last cell 102) on each tick count, if successive samples of d single bit are received with no missing samples, then it is possible to reconstruct an N-bit LFSR state after receiving N successive output bits.

It is now understood by the inventors of this disclosure that in resource-limited systems there is a trade-off between the speed of communication and time available for a processor to spend on activities other than preparing and sending data, such as sending tick counts or timestamps. Further, for smaller data packets (e.g., about 100 bytes or less), there is limited space for a payload, so if more bytes are used for timestamping then fewer bytes are available for actual data, affecting the communication bandwidth of the data transmission system. As a consequence, for some systems, the size of an LFSR state that would otherwise have a sufficient period make it unsuitable for timestamping.

BRIEF DESCRIPTION OF THE DRAWINGS

While this disclosure concludes with claims particularly pointing out and distinctly claiming one or more embodiments, various features and purposes and advantages of embodiments of the disclosure may be readily ascertained by a person having ordinary skill in the art from the following detailed description in conjunction with the accompanying drawings:

FIGS. 3C, 3D and 3E show simplified state transition diagrams of a state recovery logic, in accordance with one or more embodiments of the disclosure.

FIGS. 3J, 3K, and 3L show simplified state transition diagrams of a state recovery logic, in accordance with one or more embodiments of the disclosure.

FIGS. 4A and 4B show tables of example operations of a recovery logic state machine, in accordance with one or more embodiments of the disclosure.

DETAILED DESCRIPTION

Figure 1:
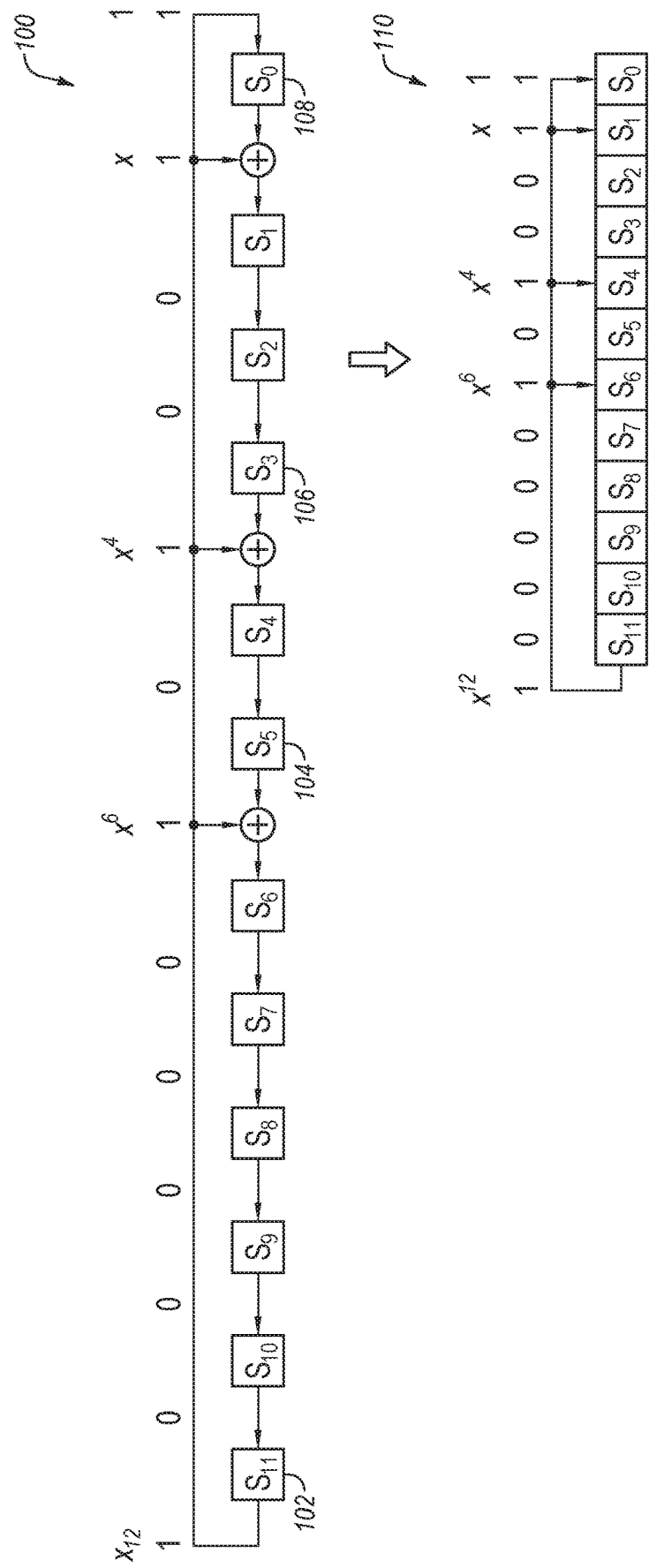
FIG. 1 shows a linear-feedback shift register in an encoding arrangement, according to the start of the art.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, "data register(s)" and "register(s)" mean memory storage quickly accessible by a processor or other digital logic circuitry to store and access data in connection with any operations it performs. As used herein, "data register(s)" is not intended to be limited to a specific architecture or interface, and, for example, includes arrangements where data is accessed in conjunction with one or more address registers and intermediate data registers (e.g., memory buffer registers and accumulate registers).

For convenience, symbols or variables may sometimes be used to describe embodiments of the disclosure. While certain conventions may be adopted with regard to use of symbols in this disclosure, they are intended to clarify and expand the disclosure, not limit it. As used herein, N is an LFSR length in bits, S is an LFSR state, m is a number of LFSR state samples y used to reconstruct an LFSR state, y is a sample derived from an LFSR state (which also may be characterized herein as a "sample output" and an "LFSR state sample"), $N_y$ is a sample length in bits, k is a tick count, and d is an interval between tick counts.

In one or more embodiments, a tick count k may correspond to a clock rate T. For example, k may increment with each clock cycle. In other embodiments, k may increment according to some function of T, for example, every 2, 3, 4, or more clock cycles.

Using the case of a data system to illustrate the symbols, above, each LFSR state sample y[k] of LFSR state S may be transmitted with a data payload of a message. If a data payload is transmitted every d ticks, and a particular sampling function $f(S)$ is used to generate y, then the m successive values y[k], y[k+d], y[k+2d], . . . y[k+(m−1)d] form a set of LFSR state samples Y=F(S) of $m \times N_y \geq N$ bits. The bits of Y may be used to reconstruct the N bits of LFSR state S[k], and the tick count k may be recovered using the LFSR state S[k].

As used herein, "coding cost" means m samples, which may also be characterized for an $N_y$ bit sample as $m \times N_y$ bits, and represents the number of samples or bits that are required or sent to recover a full LFSR state.

As used herein, "coding efficiency," means $N/(m \times N_y)$, and represents the ratio of LFSR state length to its coding cost. For example, a system that recovers a 48-bit LFSR state using samples that have a combined length of 48-bits has a coding efficiency of 1.0, or perfect coding efficiency.

Figure 2A:
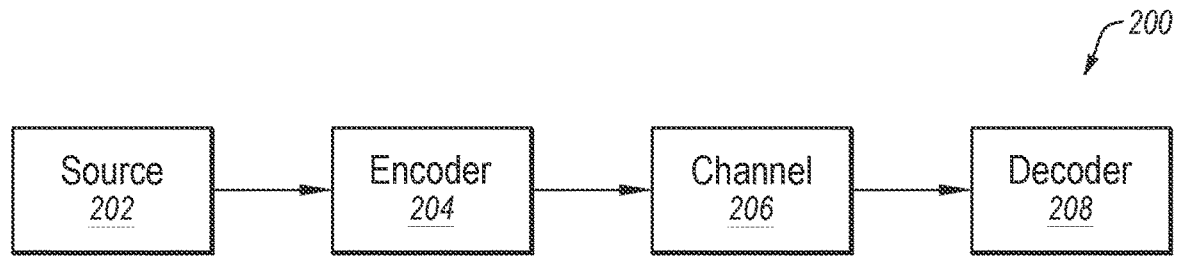
FIG. 2A shows a functional block diagram of timestamp recovery system usable with a data transmission system, in accordance with one or more embodiments of the disclosure.

FIG. 2A shows a functional block diagram of timestamp recovery system 200 usable with a data transmission system, in accordance with one or more embodiments of the disclosure. In one or more embodiments, encoder 204 may be configured to manage and update a tick count k, and source 202 may be configured to output messages at a regular interval, for example, every interval length d of tick counts k. In particular, encoder 204 may be configured to manage an LFSR and LFSR state S, and output an LFSR state sample y that corresponds to a tick count k. The LFSR state sample y that corresponds to tick count k may be characterized herein as y[k].

Communication channel 206 may be configured to receive the LFSR state sample, for example at an interface of encoder 204, and provide the LFSR state sample to an interface of decoder 208. In one embodiment, communication channel 206 may be a data bus. Decoder 208 may be configured to receive one or more LFSR state samples, and output a tick count.

One or more embodiments of the disclosure relate, generally, to techniques for compact timestamping performed at a source encoder, in particular, by an embodiment of an LFSR encoder. A sample of an LFSR state is provided to a host. The sample is shorter (in bit length) than the LFSR state. In a system where an LFSR is clocked every T seconds, a sample of the LFSR may be sent every d×T seconds, where d is the interval between samples or "sample interval" (which also may be characterized by a sample rate). As long as the host "knows" the sample rate (e.g., receives it in advance, receives it during transmission, recovers it, guesses it, etc.) and the encoder adheres to the sample rate (i.e., the transmission of the samples is consistently periodic), then it may recover the LFSR state and the tick count.

Some embodiments of the disclosure relate, generally, to techniques for decoding timestamps performed at a host (e.g., that includes decoder 208), for example, by an LFSR decoder. A number of samples of LFSR states may be used to recover a full state of the LFSR, and, subsequently, a tick count. As long as a total length of the LFSR state samples is at least as long (or longer) than the total length of the LFSR that was sampled and a sufficient number of LFSR samples are linearly independent (as discussed, below), then the samples may be used to recover one or more states of the LFSR at times associated with the samples. The LFSR state samples may be the samples received from a target, samples predicted by the host, and combinations thereof.

Figure 2B:
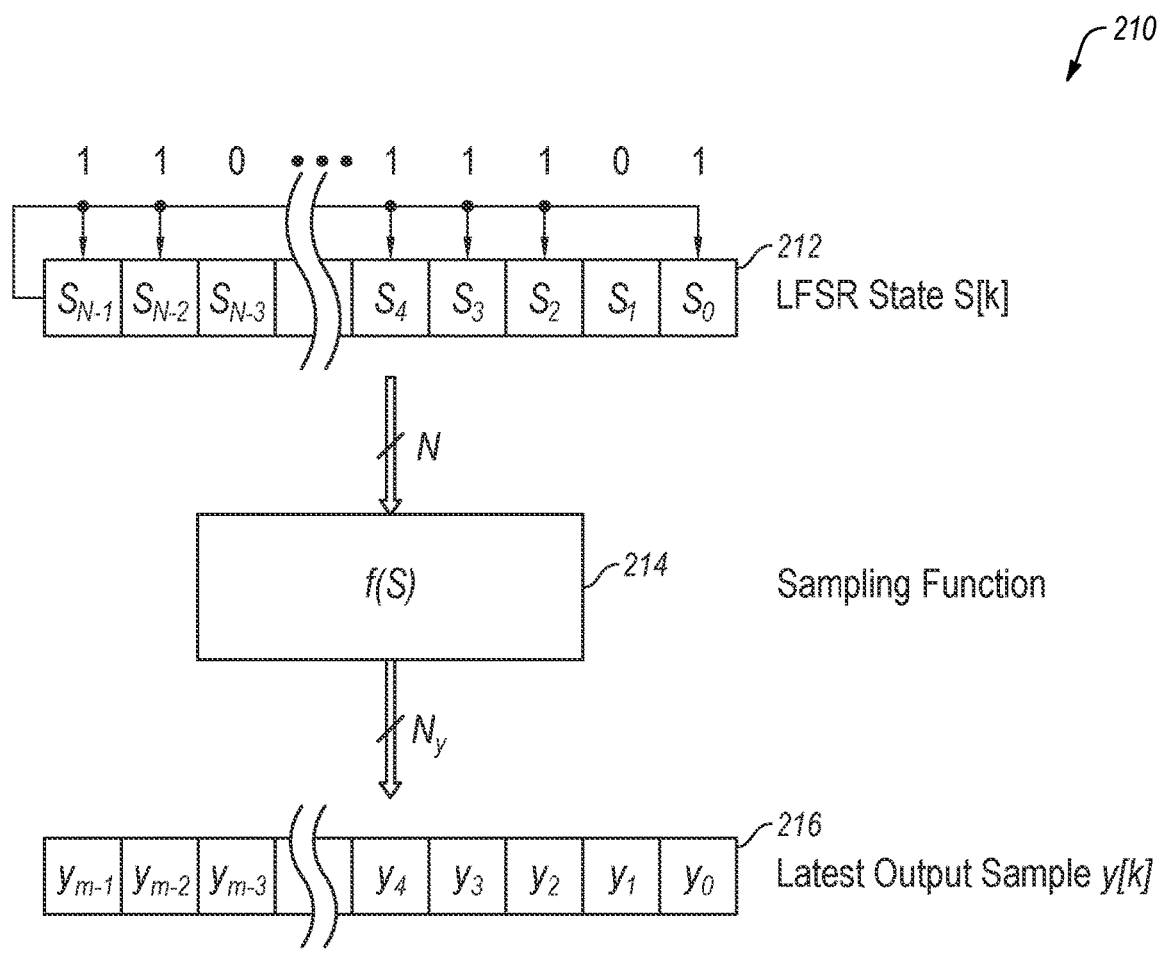
FIG. 2B shows a functional block diagram of an LFSR encoder, in accordance with one or more embodiments of the disclosure.

FIG. 2B shows a functional block diagram of an LFSR encoder 210, in accordance with one or more embodiments of the disclosure. The LFSR encoder 210 includes an LFSR 212, a linear sampling function 214 (or just "sampling function" 214), and sample registers 216. The sampling function 214 may be a combination of selection and XOR gates operatively coupled to a selected subset of the register cells of the LFSR 212.

Figure 2C:
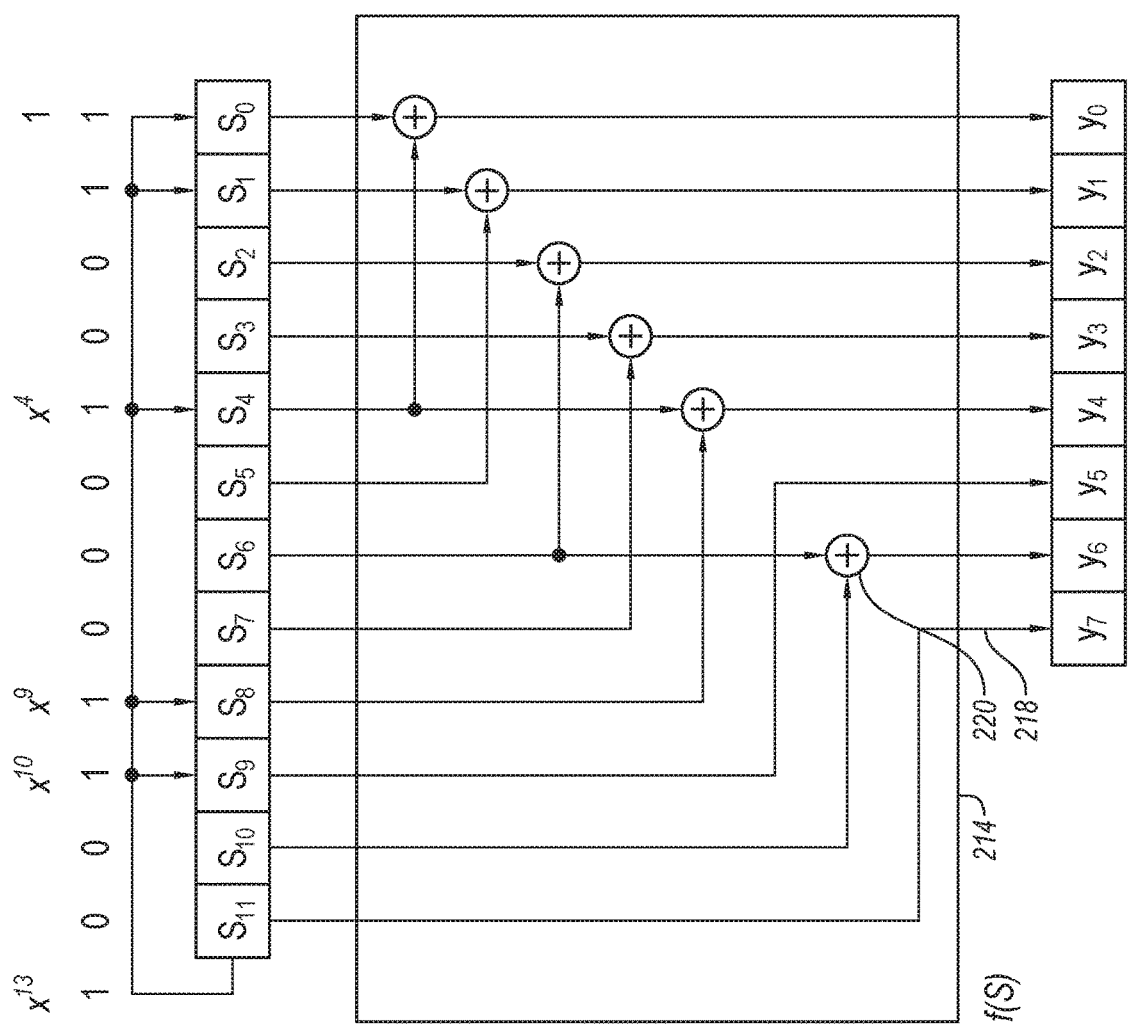
FIG. 2C shows sampling function implemented as selection and XOR gates, in accordance with one or more embodiments of the disclosure.

FIG. 2C shows sampling function 214 implemented as selection (e.g., bit 218) and XOR gates (e.g., subset bits 220), in accordance with one or more embodiments of the disclosure. The LFSR encoder 210 may be operatively coupled to a system clock that is clocked at a regular rate (e.g., T), and the LFSR 212 is configured to be clocked at the regular rate. While the output of the sampling function 214, and the LFSR state samples stored at sample registers 216, will typically change each time LFSR 212 is clocked, the output of the sample register 216 may be used at a lower rate that occurs every d×T seconds.

With regard to the characteristic polynomial of the LFSR 212, any primitive characteristic polynomial may be used. In software implemented embodiments, primitive polynomials of the form $x^N + g(x)$ where g(x) is a polynomial of degree 15 or less, may be advantageous. Such LFSRs may be implemented efficiently by a series of rotate left instructions, one per word, along with a conditional skip and an XOR of the coefficients representing g(x) with the least significant 16 bits of the LFSR state.

The number of coefficients of a characteristic polynomial may influence the linear independence of samples. Certain characteristic polynomials that have too few coefficients may limit the linear independence of samples. So, in one or more embodiments, the number of coefficients may be selected based on criteria for available linearly independent bit subsets for a given characteristic polynomial.

In one or more embodiments, the sampling function 214 may be implemented as combinational logic, in firmware or hardware, configured to compute a pure stateless function of the LFSR state S[k]. The sampling function 214—i.e., $f(S)$—may be selected to map from an LFSR state S (with N bits) to a sampled state y (with $N_y$ bits). So, at each time tick k, N bits of the LFSR state S[k] may be used to compute a sample $y[k] = f(S[k])$ consisting of $N_y$ bits (bit size $N_y < N$), and m successive samples of y=ƒ(s) may be used to recover the state S. In other words, if Y=F(S) is defined as m successive samples of y=ƒ(S), taken at intervals d, i.e., Y[k]=y[k]| y[k−d] | . . . | y[k−(m−1)d] where the vertical bar "|" means concatenation, then S may be recovered by computation of a suitable function S=G(Y). The sampling function ƒ(s) and aggregate sampling function F(S) may be linear, in which case Y=F(S)=AS for some matrix A and y=ƒ(S)=$A_y$S for a sampling matrix $A_y$. For example, suppose S is a column vector of 53 bits, f(S) produces 8-bit samples, and Y=F(S) is a column vector of 56 bits, comprised of seven successive samples of ƒ(S). Then A is a 56×53 matrix. The condition for reconstructing S from Y=F(S)=AS is that A has at least as many rows as columns, and has full rank (in the example, A must have rank 53).

Notably, the sampling function 214 is linear—that is, each bit of y consists of a selection of particular state bits, or output of XOR gates with inputs connected to particular state bits. If ƒ(S) is selected such that the set of bits y[k], y[k−d], y[k−2d], . . . y[k−(m+1)d] are linearly independent for a value d, then it may not be easy or even possible to select the same subset of bits that will have perfect coding efficiency for other values of d. So, to adapt one or more embodiments to different delay values d, redundancy may be provided such that a coding cost is greater than the state size (m×$n_y$>N), or combinations thereof. In other words, matrix A, discussed above, has full rank but is not a square matrix (e.g., it has more rows than columns), so that the coding efficiency is less than 1.

The length of each sample may be selected based on a desired number of samples used to recover an LFSR state at a particular tick count. Generally, the total length of the samples (actual and predicted) used to recover an LFSR state will be longer (in bits) than the length of an LFSR state.

The sampling function 214 may be difficult (in terms of memory) to express directly as a matrix $A_y$. For example if N=48 and $N_y$=8 then 384 bits (48 bytes) are required to specify a matrix $A_y$ directly. This form includes all possible linear sampling functions expressible as a matrix $A_y$. This may be characterized as the "direct form," which may lead to overly complex implementations of a matrix $A_y$ and a large cost (384 bits) to communicate and store the specification of a matrix $A_y$. While one or more embodiments may utilize the direct form of a matrix $A_y$, the inventors of this disclosure appreciate a need for a technique to allow a sufficiently large subset of possible matrices A, which has enough flexibility to accommodate a reasonable range of polynomials and different values of the sampling interval d.

In one or more embodiments, a matrix $A_y$ may be expressed in a binary mask form. For example, sampling matrix $A_y$ may be expressed by the following binary mask:

000000100000000100000000000000000000000000000000

000000000000000000010000000000010000000000000000

000001000000000000010000000000000000000000000000

100000000000000000000000000000000100000000000000

000000000000000010000000010000000000000000000000

000000000000000100000000001000000000000000000000

000000000000000100000000000000000000000000001000

000000000000000100000000000000000000000010000010000000

This matrix $A_y$ produces a full set of 48 linearly independent bits when used with m=6 successive samples of sampling interval d=2 and the LFSR polynomial 0x10000000000b7 ($x^{48}+x^7+x^5+x^4+x^2+x+1$); the mask is utilized by producing one output bit for each row of the matrix, with a sum (modulo 2) of various bits of the LFSR state according to the binary mask, as illustrated in Table 1:

TABLE 1

| row | equation (+ mod 2 = XOR) |
|---|---|
| 0 | $y_0 = S_{31} + S_{41}$ |
| 1 | $y_1 = S_{15} + S_{27}$ |
| 2 | $y_2 = S_{27} + S_{42}$ |
| 3 | $y_3 = S_{14} + S_{47}$ |
| 4 | $y_4 = S_{21} + S_{30}$ |
| 5 | $y_5 = S_{20} + S_{31}$ |
| 6 | $y_6 = S_6 + S_{32}$ |
| 7 | $y_7 = S_7 + S_{13}$ |

In one embodiment of the binary mask form, the matrix may be constrained so that it always has two bits per row. One way to specify the binary mask is to use the bit numbers:

31, 41, 15, 27, 27, 42, 14, 47, 21, 30, 20, 31, 6, 32, 7, 13

Notably, in this example there are 16 nonzero coefficients, requiring 16 bytes if one byte is used per bit index.

In one or more embodiments, a modified run-length encoding (RLE) may be used where each number k specifies (k−1) zeroes and a "1." One advantage of an RLE method is that that the encoder does not have to assume each row has exactly two bits. A disadvantage of a sampling matrix based on an RLE method is that even if it is constrained to have two bits per row, it does not translate into simple hardware or software. There are too many possibilities; hardware implementations would need a number of large multiplexers to select from the LFSR state bits, and, software implementations will be very slow.

In one or more embodiments, certain restrictions are made on the matrix $A_y$, which translate into easier software or hardware implementations, and which can be encoded in fewer bits, while still allowing enough flexibility to achieve desired performance requirements for a wide range of polynomials and sampling intervals.

In one or more embodiments, a matrix $A_y$ is defined that has at most three nonzero bits per row; the nonzero bits lie within three diagonals c=8$g_i$+r where c, r are the column and row number, and $g_0$, $g_1$, and $g_2$ are arbitrary distinct values such that 0≤$g_0$<$g_1$<$g_2$<8; and the nonzero bits are determined by three bit masks $M_0$, $M_1$, and $M_2$: column c of row r is 1, if c=8$g_i$+r and bit r of mask $M_i$ is 1 for i=0, 1 or 2, otherwise column c of row r is 0. This restriction permits such a matrix $A_y$ to be specified for N≤64 in a very compact form utilizing at most 32 bits (4 bytes): 8 bits for each of the three masks $M_0$, $M_1$, $M_2$, and 8 bits to encode $g_0$, $g_1$, $g_2$ using the positions of three 1 bits within an 8-bit word, for example $g_0$=2, $g_1$=5, $g_2$=6 would be encoded by setting bits 2, 5, and 6 to 1, namely binary 01100100.

Notably, this particular structure does not, by itself, enhance the likelihood that full state recovery will occur. It facilitates simple hardware/software implementations, and allows flexibility that facilitates full state recovery.

In one or more embodiments, sample register 216 may comprise one or more data register configured to store samples y of $N_y$ bits at tick count k. Sample register 216 may be configured to store a current sample y[k], however, it is foreseen that there may be some applications where it is advantageous to store a history, e.g., a previous sample, y[k−d].

Figure 3A:
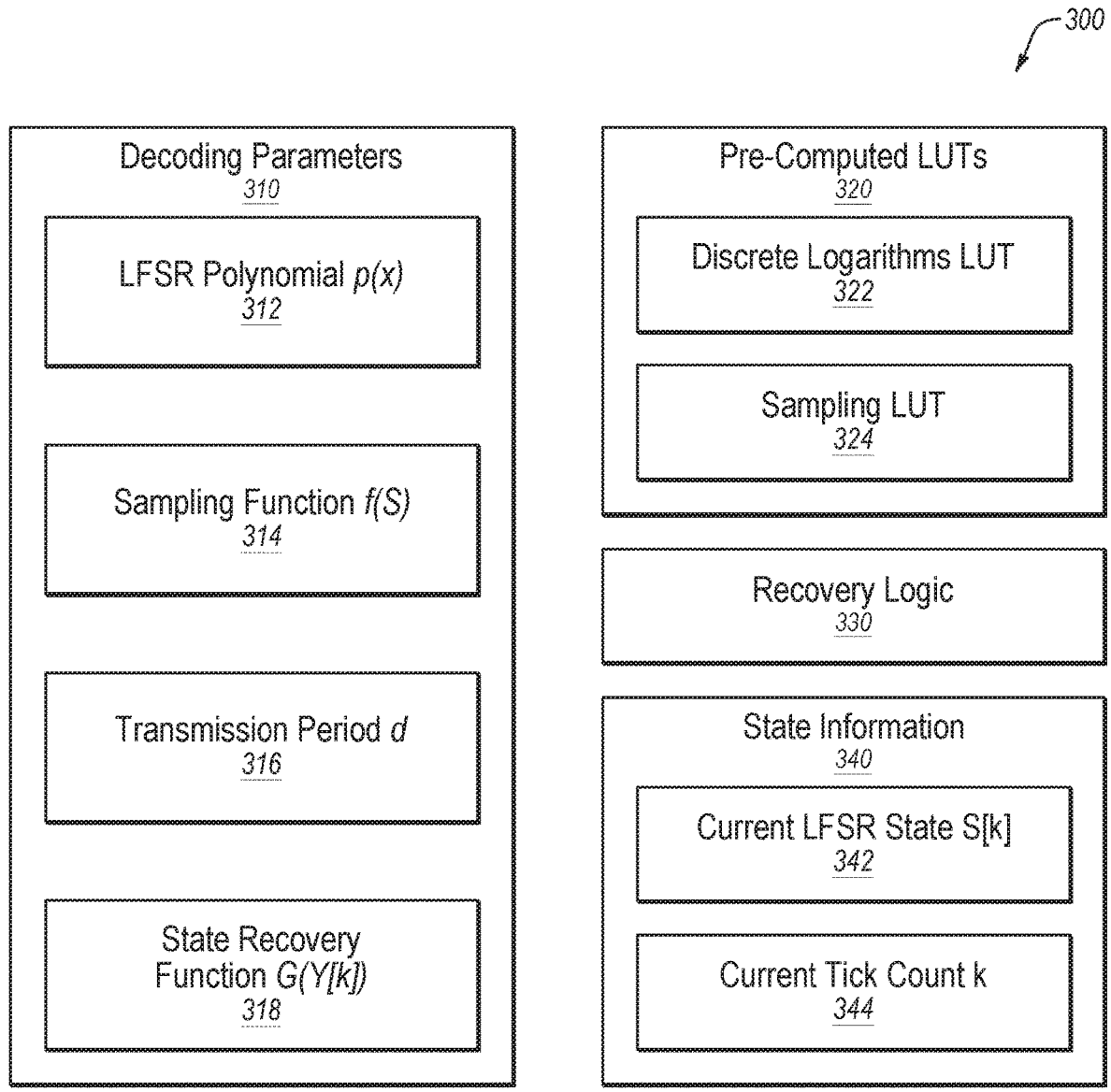
FIG. 3A shows a simplified block diagram of a software LFSR decoder, in accordance with one or more embodiments of the disclosure.

FIG. 3A shows a simplified block diagram of a software LFSR decoder, in accordance with one or more embodiments of the disclosure. The LFSR decoder 300 shown in FIG. 3A includes decoding parameters 310, pre-computed LUTs 320, and recovery logic 330. The decoding parameters 310 are known ahead of a decode and may include an LFSR polynomial 312 p(x), sampling function 314 ƒ(S), sampling interval 316 d, and state recovery function 318 G(Y).

In one or more embodiments, the pre-computed LUTs 320 may include a discrete logarithm LUT 322 and a predicted samples LUT 324 (or just "LFSR state samples LUT 324"). The discrete logarithm LUT 322 may be a look-up-table configured to take advantage of redundancy and predictability of an LFSR state and pre-compute discrete logarithms, or parts of logarithms, usable to recover an LFSR state from state samples. In one embodiment, the pre-computed discrete logarithms stored at the discrete logarithm LUT 322 are computed prior to data transmission and are not changed during data transmission. Any suitable technique may be used to compute discrete logarithms of some unknown element $u=x^k$ in the LFSR's finite field and thereby determine k. For example, discrete logarithm may be computed by breaking down a period of an LFSR into a product of powers of small prime factors, then using an algorithm for computing a discrete logarithm that applies to groups whose order is a prime power, such as the Silver-Pohlig-Hellman algorithm.

In one or more embodiments, the predicted samples LUT 324 may be a look-up-table configured to store and update a number L (also characterized herein as a "look-ahead length") of predicted samples, states, and tick counts. In a case of a look-ahead length L, a key y[k], and a current tick count of k, then the values containing LFSR states and tick count values may be:

y[k+d]→(S[k+d], k+d)
y[k+2d]→(S[k+2d], k+2d)
y[k+3d]→(S[k+3c/], k+3d)
. . .
y[k+Ld]→S([k+Ld], k+Ld)

In one or more embodiments, the look-ahead length L may be selected based on a desired tradeoff between memory and cost of computation. That is, a smaller look-ahead length L will require less memory and a LUT will be quicker to update than if using a comparatively longer look-ahead length. A longer look-ahead length L will provide more robustness to gaps in transmission, that is, larger the look-ahead length L then the more likely that after a gap, a received sample may be found in the predicted samples LUT 324.

As described, previously, in one or more embodiments, LFSR state recovery function 318 G(y[k],y[k−d],y[k−2d], . . . ) may be constructed by computing transfer function matrix A from the state S[k] to Y=F(S) (i.e., the m×$N_y$ received bits) and computing a generalized inverse matrix B such that AB=I. Then, an estimate of the original state S=G(Y)=BY where combined set of received samples Y is the received samples (e.g.,=y[k]|y[k−d]|y[k−2d] . . . ), concatenated into a single row and transposed into a column vector. In one or more embodiments, additional computational logic may be incorporated to further take advantage of redundancy, the transmission interval 316 d, and other a priori knowledge of the encoder and/or LFSR.

In some embodiments, A and B may include sub-matrices and corresponding sub-inverse matrices that, in conjunction with recovery logic 330, increase the efficiency of state and tick count recovery processes. Moreover, one of ordinary skill in the art would understand that transfer function matrix A and generalized inverse matrix B may be represented in other forms, for example, equations.

In one embodiment, when a sample interval d is known to the host ahead of time, but the characteristic polynomial of the LFSR is not known, then the host may be configured to infer the characteristic polynomial, for example, using the Berlekamp-Massey algorithm, given 2N successive samples.

One or more embodiments, relate, generally, to a calibration process that enables, by way of example, a decoder to determine a sampling function used to generate LFSR state samples. When a sample interval d and characteristic polynomial of an LFSR are known to a host ahead of time, but the sampling function ƒ(S) is not known to the host, then the host may be configured to infer the sampling function ƒ(S) responsive to the calibration process, given enough successive samples and knowledge of the tick count or sample interval d.

For example, given a 60-bit LFSR with 8 bits per LFSR state sample y[k], a host may be configured to use 60 successive samples of the bits of LFSR state sample y[k] and the bits of LFSR state S[k], constructing a 60×8 matrix $D_Y$ and a 60×60 matrix $D_S$, and solving $D_Y=D_S M$ for a 60×8 matrix M; where each column of M represents a bit mask for each bit of LFSR state sample y[k] that specifies which bits of S are XOR'd together to determine the bit of LFSR state sample y[k]. One of ordinary skill in the art would understand that there are other suitable techniques for solving for M. After receiving the 60 calibration LFSR state samples and discovering the sampling function, a decoder may receive just the m LFSR state samples to recover LFSR states. In one or more embodiments, the matrix $D_Y$ consists of the samples of y, one for each row, and the matrix $D_S$ consists of the samples of S[jd], one for each row, for j=0 to 59.

In one or more embodiments, when sampled output bits are purely a selection of individual state bits and are sorted in order of bit number, then a host may be configured to query a source to send the sampled bits in bitmask form. (e.g., for bit numbers 0, 1, 2, 3, 4, 7, then the mask 0x9F is sufficient to describe these bits if they are known to be in order). So, returning to the earlier example where matrix $A_y$ is defined to have at most three nonzero bits per row and that lie within three diagonals, then values $g_0$, $g_1$, $g_2$, $M_0$, $M_1$, and $M_2$ may be transmitted from source to host.

The recovery logic 330 is configured to recover the state of an LFSR responsive to m samples Y, and recover a count tick responsive to the recovered state of the LFSR. The state recovery logic 330 may be configured to determine k from Y and S[k] using (i) a discrete logarithm; (ii) using state evolution; and/or (iii) using a LUT of predicted samples. For the discrete logarithm, the recovery logic 330 may be configured to process m samples Y responsive to the state recovery function 318 G(Y), solve Y=AS for S, and then solve for k as the discrete logarithm of S. State evolution involves using k given $S[k+d]=x^d S[k]$ and computing an expected y[k+d]=ƒ(S[k+d]), and if it matches the next received sample then add d to the tick count k and update the state S with S[k+d]. The LUT method involves matching the current sample y to a sample stored at the LUT and using the value for the state S that matches the sample y, and, when there is sufficient confidence, updating the next L look-ahead values of S[k] and y[k] using state evolution.

Generally, if there is no sample-loss, then the recovery logic 330 may recover the state S[k] by performing state evolution to check that the next received sample y[k] matches the next expected value of y[k]. However, there may be missing samples. So, in one or more embodiments, the recovery logic 330 shown in FIG. 3B implements a form of tiered confidence decoding with a state machine 332.

As explained, below, the recovery logic 330 may be configured to use more (or less) a priori information of the LFSR and operate more (or less) efficiently in terms of computational intensity. In other words, there is a tradeoff between relying on little to no past history, or relying on past history. If the recovery logic 330 relies on as little past history as possible, it uses Y=y[k], y[k−d], y[k−2d] . . . the most recent samples, without regard to any earlier samples or any previous attempts compute the LFSR state or a tick count. This is a simple approach, both algebraically and in terms of implementation structure, but incurs higher computation cost to compute the tick count (because it uses discrete logarithms), and it does not produce the correct output if Y consists of inconsistent samples.

Figure 3B:
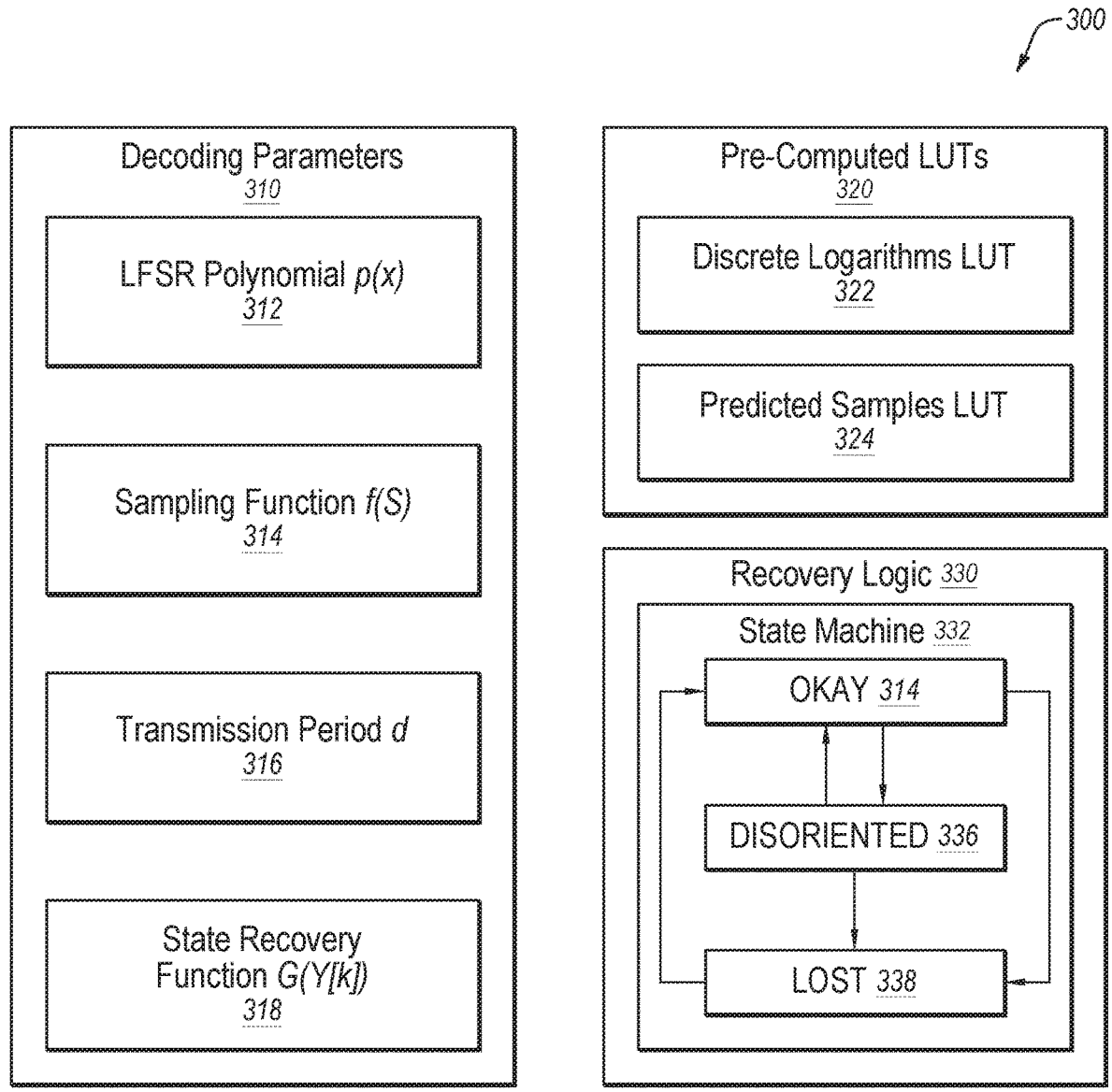
FIG. 3B shows a simplified block diagram of a software LFSR decoder and state recovery logic, in accordance with one or more embodiments of the disclosure.

In one or more embodiments, state machine 332 (as shown in FIG. 3B) may be configured to implement three states: OKAY state 334, DISORIENTED state 336, and LOST state 338. These states reflect the degree to which the recovery logic 330 is configured to rely more or less on past history, and to attempt to transition back to a state where it can rely on the past history. Use of the word "state" herein is not intended to require a specific mode of operation.

In OKAY state 334, the received samples y[k] (or a number of recently received samples y[k] defined in a count interval) follow in order, and updating the state S is just a matter of multiplying by $x^d$ in the LFSR's finite field.

In DISORIENTED state 336, there may be a few missing samples and the decoder 300 is configured to update the state S responsive to values stored in the predicted samples LUT 324. In LOST state 338, there may be many missing samples and the decoder 300 is configured to attempt to gather enough samples to perform a full discrete logarithm. In one embodiment, state transitions are initiated responsive to confidence levels associated with the degree to which the received samples y[k] are consecutive. Confidence level thresholds or confidence heuristics may be used to implement the state transitions of the state machine 332. Further, missing samples may include lost samples (e.g., an expected sample for a given transmission interval is not present), and incorrect samples (e.g., a sample value is incorrect, or corrupted).

In LOST state 338, there may not be enough samples to reconstruct the LFSR state S, and the recovery logic 330 may be configured to attempt to increase confidence (e.g., gather sufficient samples to show that there is a high probability that the samples are consecutive and can be used to reconstruct the state S), and use a discrete logarithm to compute k from S.

Generally, in all three states, decoder 300 is configured to retain received messages in the order they were received, and, if there is ambiguity, does not release messages to consumers until one of two things happen:

(1) Enough additional samples have been received to resolve any ambiguity about the tick count for all retained samples, at which time retained samples are released (in the order they were received) and associated with an appropriate tick count for each message; or (2) The receiver has determined that it is not possible to determine the tick count for some of the retained samples, at which time they are released (in the order they were received) and marked accordingly, so that consumers know these occurred at an unknown time. There are at least two reasons why this would occur:

(2a) Enough later samples have been received so that it is possible to reconstruct the timestamp of those later samples, but the earlier samples are not consistent with later samples; or (2b) The receiver stops receiving samples for a long period of time, longer than some predetermined timeout. The presence of a timeout makes it likely that any new samples will occur after a long gap, and it is probably not possible to determine the tick count of the retained samples that were received before the gap. Use of a timeout also ensures that the latency is bounded between when a message is received and when it is released to consumers.

Recovery logic 330 operating in conjunction with state machine 332 in accordance with one or more embodiments will now be described. By way of example, if d=7 and L=5, and decoder 300 has already received samples y[0], y[7], y[14], and y[21], and the tick count k=21 and LFSR state S[21] are known, then predicted samples LUT 324 contains the following entries:

y[28]:(S[28],28),
y[35]:(S[35], 35)
y[42]:(S[42], 42)
y[49]:(S[49], 49)
y[56]:(S[56], 56)

Recovery logic 330 expects y[28] to be the next received sample based on the entries at predicted samples LUT 324. If the expected sample is received then the recovery logic 330 updates state information 340. The tick count 344 is updated to k=28, and LFSR state is updated to S[28]. Further, predicted samples LUT 324 is updated: y[28] is dropped from the table and y[63]:(S[63], 63) is added to the table.

If y[42] is received instead of the expected sample, since this is in the LUT 324, the recovery logic 330 may be configured to update tick count to k=42 and LFSR state to S[42], and state machine 332 transitions to the DISORIENTED state, since it appears a few samples were skipped.

If y[637] is received instead of the expected sample, and y[637] is not in LUT 324, then the state machine 332 transitions to the LOST state 338, and recovery logic 330 disregards the relevance of the information in the LUT 324, and gathers received samples until it has enough information to determine a state and a tick count using full state recovery (e.g., S=BY and a discrete logarithm to determine the tick count k from state S).

In one or more embodiments, the recovery logic 330 may be configured to use more samples than necessary (i.e., >m) to increase confidence that the recovery logic 330 recovered sufficient samples to reconstruct the LFSR state S. For example, assume a 48-bit LFSR with 16-bit output samples and a coding cost of 48 bits (i.e., three 16-bit samples). The minimum number of samples to reconstruct state S is three, but the recovery logic 330 may be configured to use two "confidence samples" and so waits until there are five samples y[k1], y[k2], y[k3], y[k4], y[k5], and then reconstructs state $S_1$ from (y[k1],y[k2],y[k3]), state $S_2$ from (y[k2],y[k3],y[k4]), and state $S_3$ from (y[k3],y[k4],y[k5]). In one embodiment, the recovery logic 330 may be configured to determine a number of confidence samples responsive to a current confidence level and a threshold, a heuristic, or combinations thereof.

Continuing the example, the recovery logic 330 determines that the three reconstructed states, $S_1$, $S_2$ and $S_3$ are consistent if $S_2=x^d S_1$ and $S_3=x^d S_2$ in the LFSR's finite field (where x is the generating element of the finite field), otherwise the states are deemed inconsistent. If the recovery logic 330 determines that the reconstructed states are consistent, then the recovery logic 330 determines that the received samples likely come from (or at least are consistent with) consecutive samples given an interval d. In any case, with a consistent set of recovered states, the recovery logic 330 may perform a discrete logarithm to obtain $k_1$ from the first recovered state $S_1$, and may add d to each successive sample to determine $k_2$, $k_3$, etc.

FIGS. 3C-3L show state transition of the recovery logic 330 according to the state machine 332, in accordance with one or more embodiments of the disclosure. Simply for ease of description, and not limitation, each figure shows a single state transition. In each case, it is assumed that the triggering event is receipt of a new sample.

FIGS. 3C, 3D, and 3E show example state transitions from the OKAY state 334 responsive to received samples, in accordance with one or more embodiments of the disclosure.

FIG. 3C shows a recovery process where the state machine 332 is in an OKAY state 334, according to one or more embodiments. When the received sample matches the expected sample (condition 342), then the state transition 341 is a self-transition (which may also be characterized as no transition). Here, there is high confidence in the samples because the sample y[k+d] for a given count interval matches what was expected for that count interval. The recovery logic 330 increments k by the transmission interval d (operation 343) and computes S[k+d] from S[k] (operation 344). The samples LUT 324 may update the entry of k+d with k+(L+1)d (operation 345) and the decoder 300 may release the data with timestamp k+d (operation 346). Notably, the oldest entry in the predicted samples LUT 324 is now that of k+2d, the expected LFSR sample for the next received message is y[k+2d], and timestamp k+d is no longer in predicted samples LUT 324.

FIG. 3D shows a recovery process where the state machine 332 is in an OKAY state 334, according to one or more embodiments. When the received sample does not match the expected sample (condition 352), and the received sample is in the predicted samples LUT 324 (condition 352) then the state transition 351 is OKAY→DISORIENTED. The recovery logic 330 obtains state S from the predicted samples LUT 324 (operation 353), and sets counter R=0 and counter D=0 (operation 354). By way of example, if the LFSR sample of the received message matches y[k+jd] for some value j, where j is a position in the predicted samples LUT 324, (i.e., how far ahead in the LUT 324 the recovery logic 330 will check), and 1≤j≤L; then the associated state and timestamp S[k+jd] and k+jd may be retrieved from predicted samples LUT 324 and the next expected LFSR sample will be y[k+(j+1)d]. Notably, the current timestamp k still represents the timestamp of that last received message that matched the expected LFSR sample value even though the timestamp count for the most recent received message is k+jd. So, the timestamp count for the most recently received message diverges from k until the state machine 332 is back in the OKAY state 334.

R is a count of successively received consistent LFSR samples, and that are retained by the decoder 300 in the order received while the recovery logic 330 attempts to error correct. D is the number of received samples that were inconsistent, while the recovery logic 330 is in a DISORIENTED state 336. The recovery logic 330 retains the received sample and data in operation 355.

FIG. 3E shows a recovery process where the state machine 332 is in an OKAY state 334, according to one or more embodiments. When the received sample does not match the expected sample (condition 362), and the received sample is not found in the predicted samples LUT 324 (condition 362), then the state transition 361 is OKAY→LOST. Notably, the predicted sample LUT 324 is not updated. The recovery logic 330 retains the received sample in operation 363.

FIGS. 3F, 3G, 3H and 3I show example state transitions from the DISORIENTED state 336 responsive to received samples, in accordance with one or more embodiments of the disclosure.

Figure 3F:
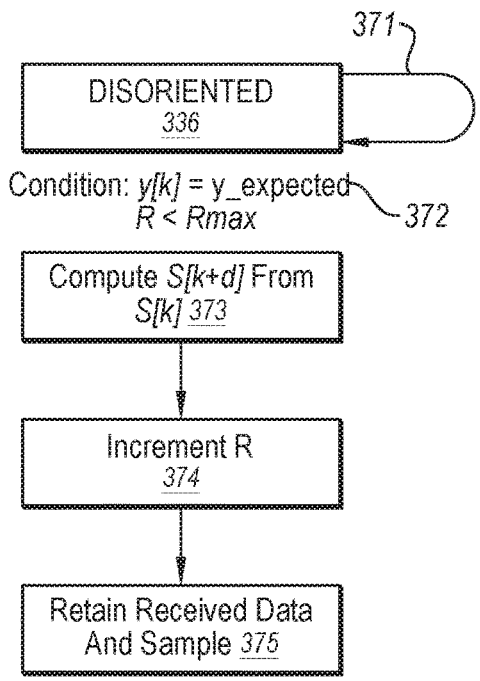
FIGS. 3F, 3G, 3H, and 3I show simplified state transition diagrams of a state recovery logic, in accordance with one or more embodiments of the disclosure.

FIG. 3F shows a recovery process where the state machine 332 is in a DISORIENTED state 336, according to one or more embodiments. If the received sample does match the expected sample (condition 372), and R has not reached $R_{max}$ (condition 372), then the state transition 371 is a self-transition (or no transition). The next expected timestamp k+(j+1)d. LFSR state S[k+(j+1)d] and expected sample y[k+(j+1)d] are computed (operation 373). R is incremented (operation 374). The received message (data and sample) are retained with a pending timestamp k+jd (operation 375).

Figure 3G:
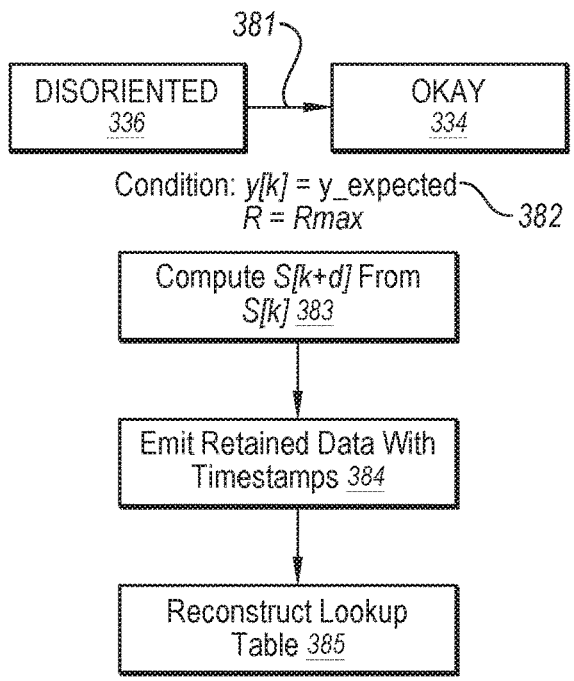

FIG. 3G shows a recovery process where the state machine 332 is in a DISORIENTED state 336, in accordance with one or more embodiments. If the received sample does not match the expected sample (condition 382), and R has reached $R_{max}$ (condition 382), then the state transition 381 is DISORIENTED→OKAY. The state S[k+(j+d)] is computed from S[k+jd] using the predicted samples LUT 324 (operation 383). Retained data is released with pending timestamps k+jd for the values of j matched in the predicted samples LUT 324 or predicted using state evolution (operation 384), and the predicted samples LUT 324 is updated (operation 385). Notably, k remains fixed while in the DISORIENTED state 336 and refers to the last tick count of a message released to consumers.

Figure 3H:
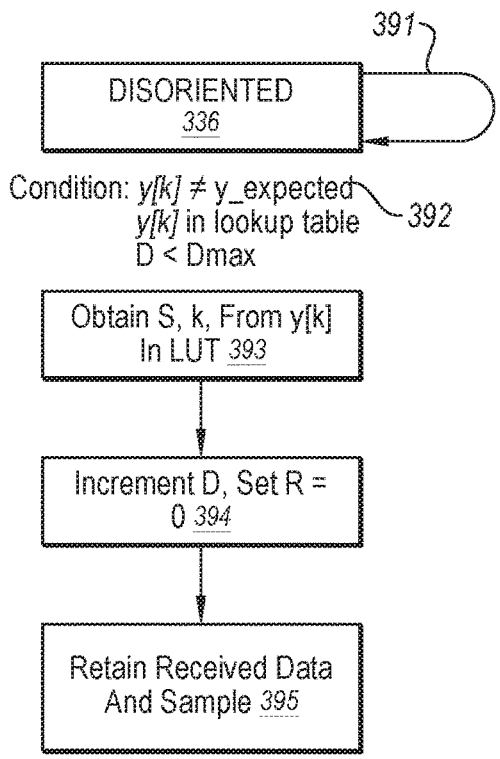

FIG. 3H shows a recovery process where the state machine 332 is in a DISORIENTED state 336, according to one or more embodiments. If the received sample does not match the expected sample (conditions 392), the received sample matches a predicted sample at predicted samples LUT 324 (conditions 392), and D has not reached Dmax (conditions 392), then the state transition 391 is a self-transition (or no transition). In other words, and by way of further explanation, if the received sample y matches y[k+jd], where k is the last tick matched during an OKAY state, j is a position in the LUT 324, and d is the count interval, then S[k+jd] and k+jd may be retrieved from the LUT 324 (operation 393). D may be incremented and R set to 0 (operation 394). The received data and samples are retained with a pending timestamp k+jd (operation 395).

Figure 3I:
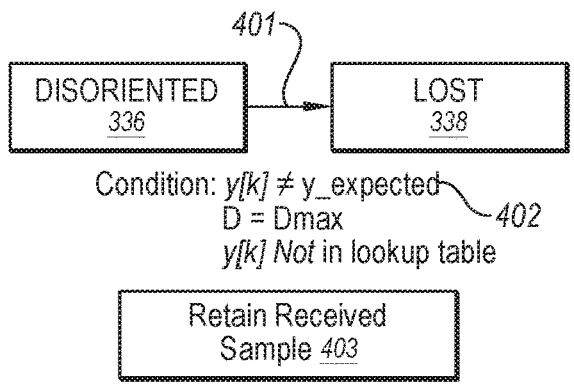

FIG. 3I shows a recovery process where the state machine 332 is in a DISORIENTED state 336, in accordance with one or more embodiments. If the received sample does not match the expected sample (conditions 402), the received sample is not in the predicted samples LUT 324 (conditions 402), and D has reached Dmax (conditions 402), then the state transition 401 is DISORIENTED→LOST. The received sample is retained (operation 403), but there are not enough samples to recover the state.

FIGS. 3J, 3K and 3L show example state transitions from the LOST state 338 responsive to received samples.

FIG. 3J shows a recovery process where the state machine 332 is in a LOST state 338, according to an embodiment of the disclosure. If less than m+c (where c is the number of additional samples for raising confidence levels) samples have been retained (condition 412), then the state transition 411 is LOST→LOST. Received samples are retained (operation 413), but there are not enough samples to recover the state.

FIG. 3K shows a recovery process where the state machine 332 is in a LOST state 338, according to one or more embodiments. If at least m+c samples have been retained and the reconstructed state is consistent (condition 422), then the state transition 421 is LOST→OKAY. The recovery logic 330 recovers the state S from the retained samples (operation 423). The count k is computed from the most recent recovered state S using a discrete logarithms computation, which may involve using the discrete logarithm LUT 322 (operation 424) if the particular algorithm uses discrete logarithm tables. Retained data is released with timestamps k−(m+c−1)d, k−(m+c−2)d, . . . k−d, k for a total of m+c messages (operation 425). The predicted samples LUT 324 is updated/reconstructed using the computed S, k and received samples y[k] (operation 426).

FIG. 3L shows a recovery process where the state machine 332 is in a LOST state 338, according to an embodiment of the disclosure. If at least m+c samples have been retained and the reconstructed state is inconsistent (condition 432), then the state transition is LOST→LOST (431). The oldest retained sample and its associated data is loaded (433) and released without a timestamp (434), and the state S is reconstructed from the retained samples S (operation 435).

The LFSR state samples generated by encoders along with associated data may be transmitted or stored as reports, for example, as messages, records in a log file, records in a database, and more. By way of example, the reports may be generated based on an event or a number of events. The events may be generated by an event reporting system, and may be about operation of a system or generated from the operation of a system, for example, an embedded system. Events may be generated based on or during event intervals, and those intervals may be based on operations of the embedded system or they may be based on operational intervals that include at least part of an operation or several operations.

The state samples and associated data received in reports such as messages may be received and decoded. Other state samples and associated data received in reports such as event records may be decoded at some later time after they are created. For example, the state samples and data may be read from records of one or more event log files, and decoded by a decoder that recovers timing information from LFSR state samples in accordance with this disclosure.

In various embodiments of the recovery processes described, above, the data and samples are retained, but that is not intended to mean that the data and samples must be extracted from messages. Messages themselves may be retained with the data and sample, and when a message is released, the sample may be replaced by a tick count (or other timestamp in a format expected by the host).

FIGS. 4A and 4B illustrate example operations of a recovery logic state machine configured in accordance with one or more embodiments of the disclosure. FIGS. 4A and 4B are tables that illustrate compact timestamp encoding and decoding using example LFSRs and example output sample registers, in accordance with one or more embodiments of the disclosure.

FIG. 4A illustrates compact timestamp encoding and decoding using an example 13-bit LFSR with $P(x)=x^{13}+x^{10}+x^9+x^4+x^1$ (e.g., like the LFSR shown in FIG. 2C) and an example 8-bit output sample register (e.g., like the output register shown in FIG. 2C), in accordance with one or more embodiments of the disclosure. Decoding shown in FIG. 4A is performed using state recovery and discrete logarithms—but not a state machine. In FIG. 4A, k is the tick count, $k_m$ is the tick count k mod $2^N-1=8191$ for N=13, Δk is the tick count between received samples, S is the LFSR state S[k] in hexadecimal, y is the sampled output y[k] in hexadecimal, $S_r$ is the recovered LFSR state derived from the sample y[k] and the previously received sample y[k−d], $k_r$ is the recovered tick count mod 8191, derived from the discrete logarithm of $S_r$ (e.g., using a look-up-table), and match indicates whether $S=S_r$.

The recovered state 442 corresponding to tick count 9004 (the last four digits of the tick counts are described here for simplicity) is blank, in other words, no state recovered. Recovered state 442 is empty because, in this example, m=2 and so at least two consecutive samples are used to recover an LFSR state. Tick count 9004 may correspond to start up, a missing sample, or a gap in samples. Recovered state 444 corresponds to tick count 9020, and is the first actually recovered state, because two consecutive samples, sample 446 and sample 448 have been received.

FIG. 4B illustrates compact timestamp encoding and decoding using an example 13-bit LFSR and an example 8-bit output register, in accordance with one or more embodiments of the state machine approach described above. Decoding shown in FIG. 4B is performed using a state machine. In FIG. 4B, i is the receiver's count of received messages, $k_m$ is the actual tick count modulo $2^N-1$, Δk is the change in input tick count, y is the received sample, state is the decoder's state after processing input message i, S is the recovered LFSR state, $S_{next}$ is the expected LFSR state for the next received sample, when is the value of i when the decoder outputs columns S and $k_r$, and $k_r$ is the recovered tick count modulo $2^N-1$.

In FIG. 4B, the convention for representing the tick count is $k_m$ (i.e., represented as k modulo $2^N-1$). Moreover, the state of the recovery logic 330 of decoder 300 immediately after processing the input message (i.e., the sample y) is also shown. Notably, m+c=4 because four 8-bit output samples are used to recover the 13-bit LFSR state, that is, the required two samples and two additional samples.

As shown in FIG. 4B, in a startup phase 460, there are not enough received consecutive samples to recover the LFSR state until tick count $k_m$=48. Here, the column "when" is simply informational to show the earliest entry where there may be enough consecutive samples to recover the LFSR state (here, i=3, where i is an index of received packets, which corresponds to the fourth received packet sample). At tick count 64 (462), the recovery logic 330 has received four packet samples, and the samples are consistent, so recovery logic 330 may recover the LFSR state and next state (Snext).

As further shown in FIG. 4B, at tick count 2608, the recovery logic 330 transitions to LOST state 464 because the received sample y[2608]=80 is not the expected sample, nor is it one of the predicted samples in the predicted samples LUT 324. In particular, the delta 466 between tick count 176 and tick count 2608 of 2432 is indicative of a large gap or missed data. The recovery logic 330 transitions back to an OKAY state 468 at tick count 2656 after four consistent samples (80, 8b, 60, 60) have been received because then there are enough consistent samples for a full state recovery and discrete logarithm calculation.

As further shown in FIG. 4B, at tick count 2704, the recovery logic 330 transitions to DISORIENTED state 470 because the received sample y[2704]=90 was not the expected sample, but it is one of the predicted samples in the predicted samples LUT 324. Notably, the delta 472 between samples is 32, indicative of one missed sample. The recovery logic 330 transitions to an OKAY state 474 at tick count 2752 after enough consistent samples have been received, here four: 90, 49, a3, and 9b.

As further shown in FIG. 4B, at tick count 209, the recovery logic 330 transitions to LOST state 476 because the received sample y[209]=01 is not the expected sample, nor is it in the predicted samples LUT 324. In particular, the delta 478 between tick count 2864 and 209 is 5536 is indicative of a large gap or missed data. The recovery logic 330 transitions back to an OKAY state 480 after four consistent samples (01, 6d, b6, and f2) are received.

Notably, the last two samples repeated (both 60). In some cases, output samples may be repeated in short succession. This may occur because the LFSR state is represented by a sampled output consisting of fewer bits, so even though the LFSR state is unique and repeats after period of $2^N-1$, the sampled output may repeat more often. In one or more embodiments, decoder 300 may be configured to address the potential ambiguity caused by repeated sample values.

Figure 5:
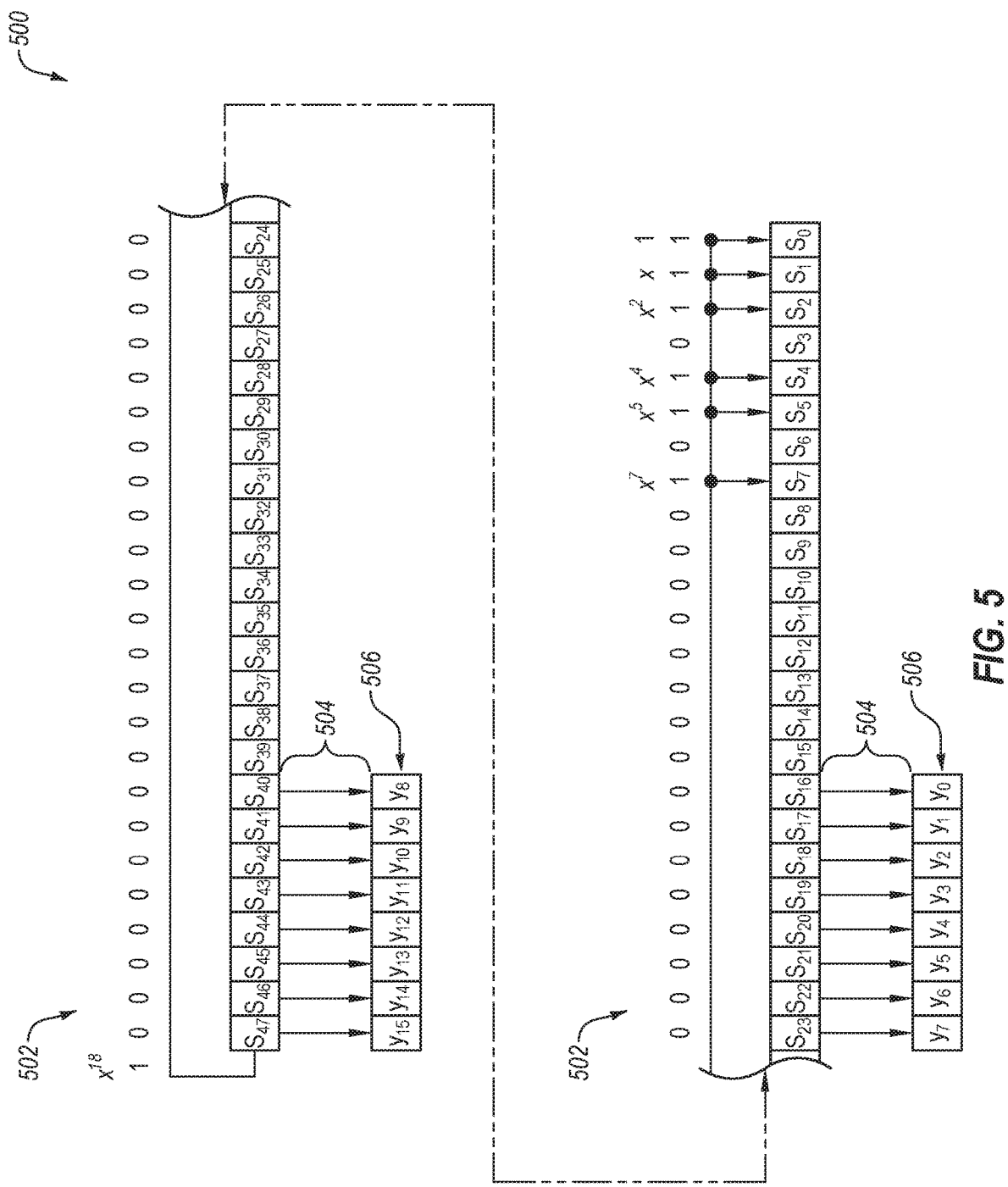
FIG. 5 shows a functional block diagram of an LFSR encoder having a sampling function configured for bit selection, in accordance with one or more embodiments of the disclosure.

FIG. 5 shows an embodiment of the LFSR encoder 500 where the sampling function 504 is configured for bit selection, and the LFSR state sample is a masked subset of the LFSR state (e.g., selected from un-masked or masked bits depending on the convention used). FIG. 5 shows a N=48-bit LFSR 502 with characteristic polynomial $x^{48}+x^7+x^5+x^4+x^2+x+1$, LFSR 502 is a maximum-length LFSR with period $2^{48}-1 \approx 2.815 \times 10^{14}$. LFSR state sample register 506 is an $N_y$=16-bit register configured to receive the output of the sampling function 504. Since matrix A for m=3 and d=8 has rank 48, encoder 500 produces a sufficient set of bits. Specifically, given that there is no redundancy between successive samples y, when three samples have been acquired, there is a total of 16×3=48 bits of timestamp data that can be used to reconstruct the LFSR state.

Figure 6A:
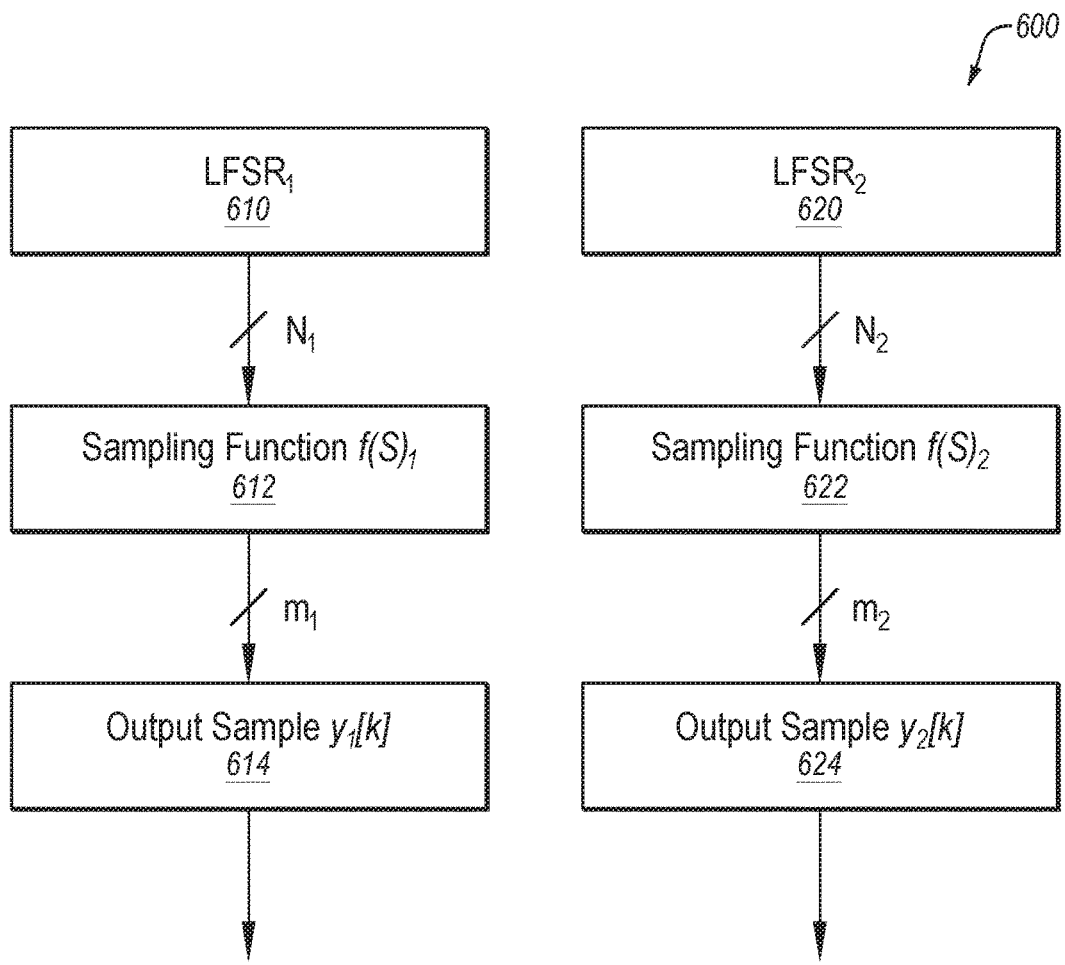
FIG. 6A shows a functional block diagram of a multi-LFSR state encoder, in accordance with one or more embodiments of the disclosure.

FIG. 6A shows an embodiment of a multi-LFSR state encoder 600 that has two (or more) LFSRs 610 and 620. Including multiple LFSRs may have advantages due to asymmetric computational costs. When, for example, using a small LFSR and a larger LFSR together, the small LFSR may be configured to determine a tick count (modulo its period) with fewer samples (i.e., a smaller value of m); since it has a smaller period, this technique works well when there are not any large gaps in tick count between messages, but in cases of large gaps it is not possible to recover the absolute tick count. So, the large LFSR may be configured to use more samples (i.e., a larger value of m) but with a larger period compared to the small LFSR, so the large LFSR may help guarantee recovery of the absolute tick count.

Turning to FIG. 6A, in one or more embodiments, LFSRs 610 and 620 are clocked and sampled simultaneously by their respective sampling functions 612 and 622. In one or more embodiments, the sampling function 612 and the sampling function 622 may be different.

In one embodiment, the periods of the LFSRs 610 and 620 are different. In one embodiment, the periods have no common factors and the overall period is the least common multiple of the individual LFSR periods.

By way of example, the states $S_1$ and $S_2$, of the LFSRs 610 and 620 may be updated every tick. Then, every d ticks, compute $y_1[k]=f_1(S_1[k])$ and $y_2[k]=f_2(S_2[k])$ where $f_1(S)$ and $f_2(S)$ are the linear sampling functions 612 and 622, and $y_1$ and $y_2$ are transmitted in the same message along with the data payload to be timestamped.

Notably, when a message consists of {y1|y2|data} where the first 8 bits are $y_1$ and the second 8 bits are $y_2$ (and the remaining bits are arbitrary data content), then both sender and receiver (or at least encoder and decoder) may be configured to use a common protocol. In other words, the message structure may be defined by a communication protocol according to which the receiver can extract from a received message the same elements that were assembled into the message by the sender.

In one embodiment, a transmitter having encoders that use multi LFSR state encoding according to one or more embodiment of the disclosure may be configured to delay transmission of one of the output samples (614,624) by d ticks, so that, for example, $y_1[k]$ and $y_2[k-d]$ are transmitted together (e.g., in the same message). This information describes an interval between k-d and k, and that interval may be used in cases where the transmission interval d changes infrequently so that a receiver/decoder may distinguish between a missing sample and a change in transmission rate.

For example, assume a situation where each message contains timestamp information, each message contains a data payload over the interval between transmitted messages, the length of the interval can change, but changes infrequently, and sometimes—rarely—one or more messages are not received at the host. If a message is lost, if only the start time is transmitted in messages, it leads to some level of doubt for the receiver. For example, when a message after the lost message is received, the receiver has no way of distinguishing a missing packet from a change in interval length, unless this information is communicated as part of the data payload (which reduces available payload for other data). So, in one embodiment, both a start and an end of an interval may be transmitted. When using a compact timestamp, a start tick count $k_{start}$ may be encoded using a first LFSR, and the end tick count $k_{end}$ may be encoded using a second LFSR. Recovery logic 330 may be configured to decode the timestamp based on the interval defined between $k_{start}$ and $k_{end}$.

Figure 6B:
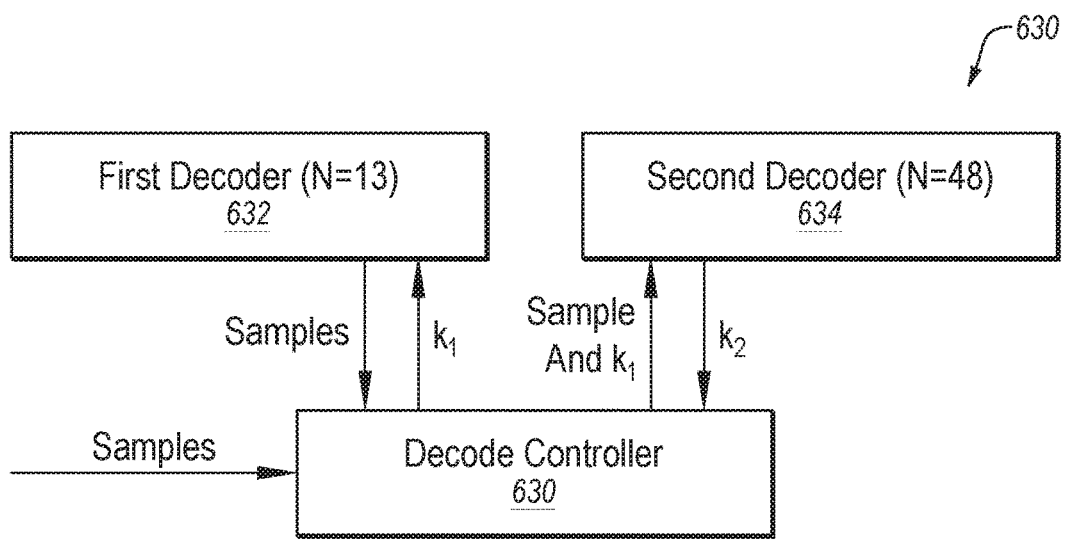
FIG. 6B shows a functional block diagram of a dual-LFSR state encoder, in accordance with one or more embodiments of the disclosure.

FIG. 6B shows a multi-LFSR state decoder 630 configured to decode multiple samples, according to one or more embodiments. Received samples (e.g., $y_1$ and $y_2$) may be decoded separately and then merged together, using, e.g., the Chinese Remainder Theorem, to determine the tick count within one overall period. In one or more embodiments, the multi-LFSR state decoder 630 may include a first decoder 632 and a second decoder 634. In another embodiment, the decoder 630 may be one decoder that is configured to for multi-LFSR state decoding. Decoders 632 and 634 are shown here to highlight functional aspects of the decoding process.

The first decoder 632 may be configured to decode a first LFSR state responsive to first state samples and recover a first tick count $k_1$ responsive to the recovered first LFSR state. The second decoder 634 may be configured to decode a second LFSR state responsive to second state samples and recover a second tick count $k_2$ responsive to the recovered second LFSR state. The lengths of the first and second LFSR states are different, in other words, one of the states has more bits than the other state. Moreover, the lengths of the first and second state samples may or may not be different, depending on the implementation. So, in one embodiment, the samples may have the same length and in another embodiment one of the state samples may have more bits than the other state samples. So, one of the first and second LFSR states and periods may be characterized as long or short, as compared to other states or periods associated with other decoders in a multi-LFSR state decoder.

By way of example, assume a case where $N_1=48$, $N_{y1}=8$, $N_2=13$, $N_{y2}=8$ for $(N_1,N_2) \rightarrow (N_{y1}, N_{y2})$ (i.e., $(48,13) \rightarrow (8,8)$) with coding costs of 48 bits (6 samples) and 16 bits (2 samples). An $N=13$ LFSR state may be used to determine tick count $k_1=k \bmod p_1$ with $p_1=2^{13}-1=8191$ after a small number of samples. An $N=48$ LFSR state may be decoded responsive to the recovered $k_1$, and a tick count $k_2$ determined responsive to the LFSR state, for example $k_1$ and $k_2$ may be combined using the Chinese Remainder Theorem to determine k such that $k \bmod 2^{N_1}-1=k_1$ and $k \bmod 2^{N_2}-1=k_2$. The $N=48$ LFSR takes at least six samples to reconstruct a complete LFSR state. Thus, the $N=13$ LFSR state may accelerate recovery of the $N=48$ LFSR state by reducing the number of possible values of the $N=48$ LFSR state.

Figure 6C:
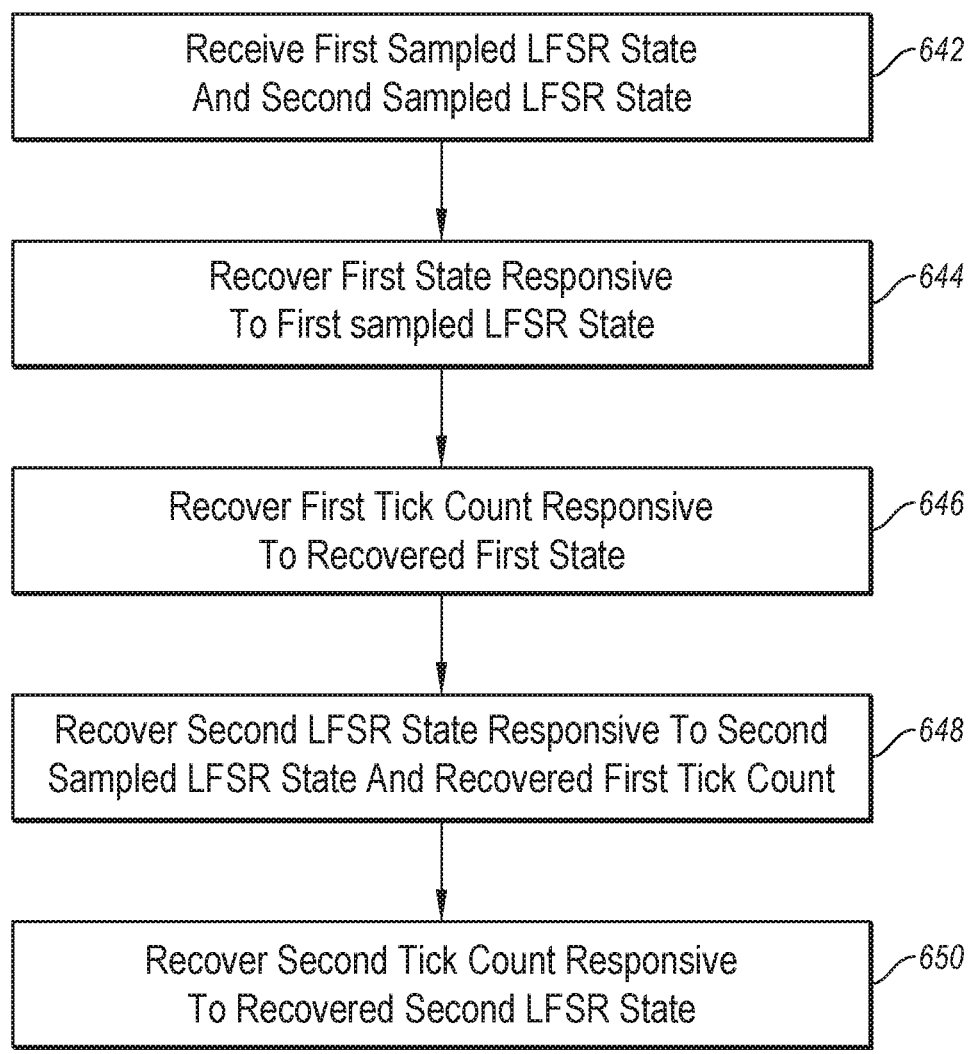
FIG. 6C shows a flowchart of decoding process for timestamps generated with dual-LFSR encoder, in accordance with one or more embodiments of the disclosure.

FIG. 6C shows a flowchart of a decode process that uses compound LFSR states, according to an embodiment of the disclosure. In operation 642, multi-LFSR state decoder 630 receives a first sampled LFSR state and second sampled LFSR state. In operation 644, multi-LFSR state decoder 630 recovers an LFSR state responsive to the first sampled LFSR state. In operation 646, multi-LFSR state decoder 630 recovers a first tick count responsive to the recovered first LFSR state. In operation 648, multi-LFSR state decoder 630 recovers an LFSR state responsive to the recovered first tick count and the second sampled LFSR state. In operation 650, multi-LFSR state decoder 630 recovers a second tick count responsive to the recovered second LFSR state.

Figure 7:
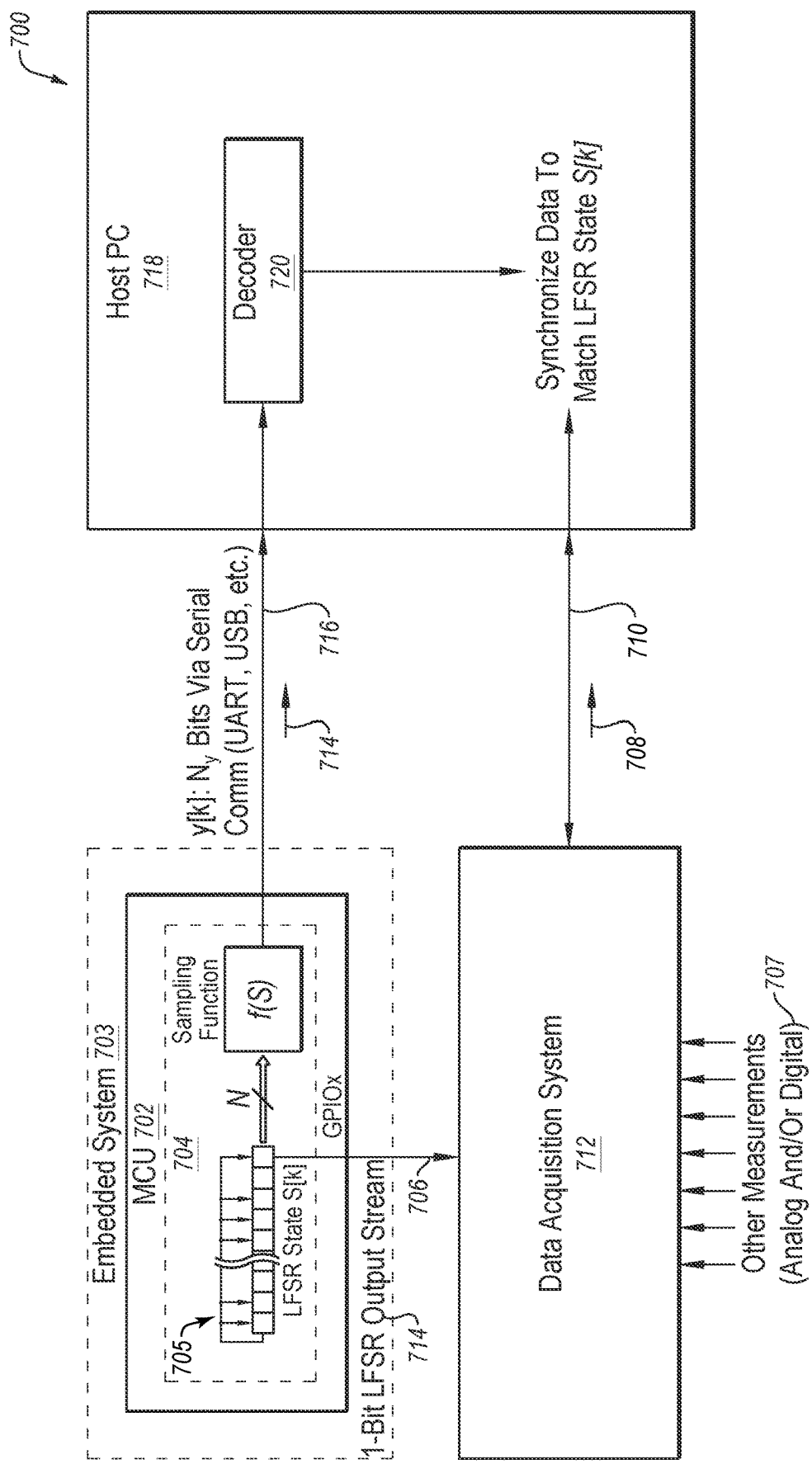
FIG. 7 shows a functional block diagram of a data system, in accordance with one or more embodiments of the disclosure.

One or more embodiments, relate, generally, to a data synchronization system usable for data transmission. FIG. 7 shows a data system 700, in accordance with one or more embodiments of the disclosure. In one or more embodiments, data system 700 includes embedded system 703, data acquisition system (DAS) 712, and host 718. Embedded system 703 may include any number of components, including customary components known to those having ordinary skill in the art. In particular, embedded system 703 includes microcontroller unit (MCU) 702 which may be, for example, a digital signal processor controller, a microcontroller according to the Harvard architecture, a programmable interface controller, combinational logic, and more.

In one or more embodiments, Data system 700 may be configured to move data about embedded system 703, which may be, for example, a circuit assembly for an appliance or device, such as a pump, battery charger, radio controlled vehicle, etc., that is controlled by MCU 702.

MCU 702 may be operatively coupled to, and configured to control embedded system 703. In one embodiment, MCU 702 may be configured to facilitate transmission of information messages 708 from embedded system 703 over data path 710 to host 718. In one or more embodiments, MCU 702 may include compact LFSR timestamp encoder 704 (e.g., implemented in firmware or hardware, for example, as a peripheral), that is configured to sample an LFSR state and generate LFSR state samples in accordance with one or more embodiments of the disclosure. MCU 702 may be operatively coupled to host 718 and may be configured to transmit LFSR state samples over data path 710 to host 718 along with other information. MCU 702 may also be operatively coupled to DAS 712, and MCU 702 may be configured to transmit LFSR state data 705 to DAS 712 over data path 706. The LFSR state data 705 may be LFSR state samples, and, in one embodiment, may be transmitted one bit at a time (e.g., according to a 1-bit sampling function) to DAS 712 to minimize I/O utilization and resource cost at the MCU 702. Generally, signal transmission quality between MCU 702 and DAS 712 will be good enough that there are no missing samples of LFSR state data and so a timestamp may be decoded from N successive samples of the 1-bit LFSR using e.g., state and tick count recovery techniques described in this disclosure.

In one or more embodiments, encoder 704 may be configured to use different sampling functions for different data paths. For example, a first sampling function may be selected for data path 710 and a second sampling function may be selected for data path 706. One of ordinary skill in the art would understand based on this disclosure that a particular sampling function may be selected for a data path based on any number of considerations, including without limitation, signal transmission quality, bandwidth, processing capability, and available memory.

In one embodiment encoder 704 may be a standalone peripheral, or a core independent peripheral running independent of the CPU core(s) of the MCU 702. In one embodiment, the encoder may be incorporated into a debugging peripheral that communicates with external devices to facilitate debugging.

In one or more embodiments, DAS 712 may be operatively coupled to embedded system 703. Optionally, DAS 712 may be operatively coupled to one or more monitoring or sensor systems or test systems, which in turn are configured to directly or indirectly provide measurement data 707 to DAS 712 about embedded system 703. Measurement data 707 may be, for example, received directly from embedded system 703 by way of test clips, probes, and the like. Measurement data 707 may be, for example, received indirectly about embedded system 703 by way of temperature measurements or other laboratory sensors.

Measurement data 707 may be one or both of analog and digital signals indicative of the state of the embedded system, for example, operation, health, etc.; or about a device under test, for example, temperature, pressure, voltage, current, etc., present elsewhere in the embedded system. The measurements may be accessible via DAS 712 by host 718, and DAS 712 may be configured to transmit measurement messages 714 that include measurement information over data path 716.

Host 718 may be configured to log information messages 708 sent by the embedded system 703 over data path 710 and synchronize information messages 708 and measurement messages 714 based on timestamp information provided with information messages 708 and measurements messages 714. In one or more embodiments, host 718 may be a diagnostic system configured to test and/or diagnose embedded system 703 based, at least in part, on information messages 708 and measurements messages 714. In one or more embodiments, Host 718 may include a compact LFSR timestamp decoder 720 that is configured to recover LFSR state data from sampled LFSR states according to one or more embodiments described herein. In one or more embodiments, Decoder 720 may be configured to recover timing information from the information messages 708 and/or measurement messages 714. The host 718 may be configured to synchronize information messages 708 and measurement messages 714 based on the recovered timing information, as well as synchronize the information and measurements carried by those messages. In this manner, the host 718 may be configured to synchronize messages received over data path 710 and messages received over data path 716.

In one or more embodiments, data paths 710, 706, and 716 may be configured such that they have specific characteristics that are prone to different amounts of noise/errors.

In one embodiment, data path 706 (which carries the 1-bit LFSR output stream 705 from MCU 702 to DAS 712) may be filtered, shielded, and/or isolated to reduce noise. The required bandwidth may not be much greater than the sampling rate of the timestamp information messages 708 sent over bus.

In one embodiment, data path 710 (MCU to DAS) may be configured for a higher bit rate than data path 706. By way of example, data paths 706 and 710 may be configured for serial communication. In one or more embodiments, data paths 706 and 710 may be a UART (universal asynchronous receiver transmitter), USART (universal synchronous/asynchronous receiver transmitter), or I2C (inter-integrated circuit), serial peripheral interface (SPI), Ethernet, Wifi, Zigbee, and combinations of data paths thereof. In one embodiment, data path 706 may be a raw data signal.

In one embodiment, data path 716 (DAS↔host) may be short, shielded for low noise, and high-bandwidth. Data path 716 may be configured for serial communication, and in one or more embodiments may be a high speed universal serial bus (USB), or an Ethernet connection.

Figure 8:
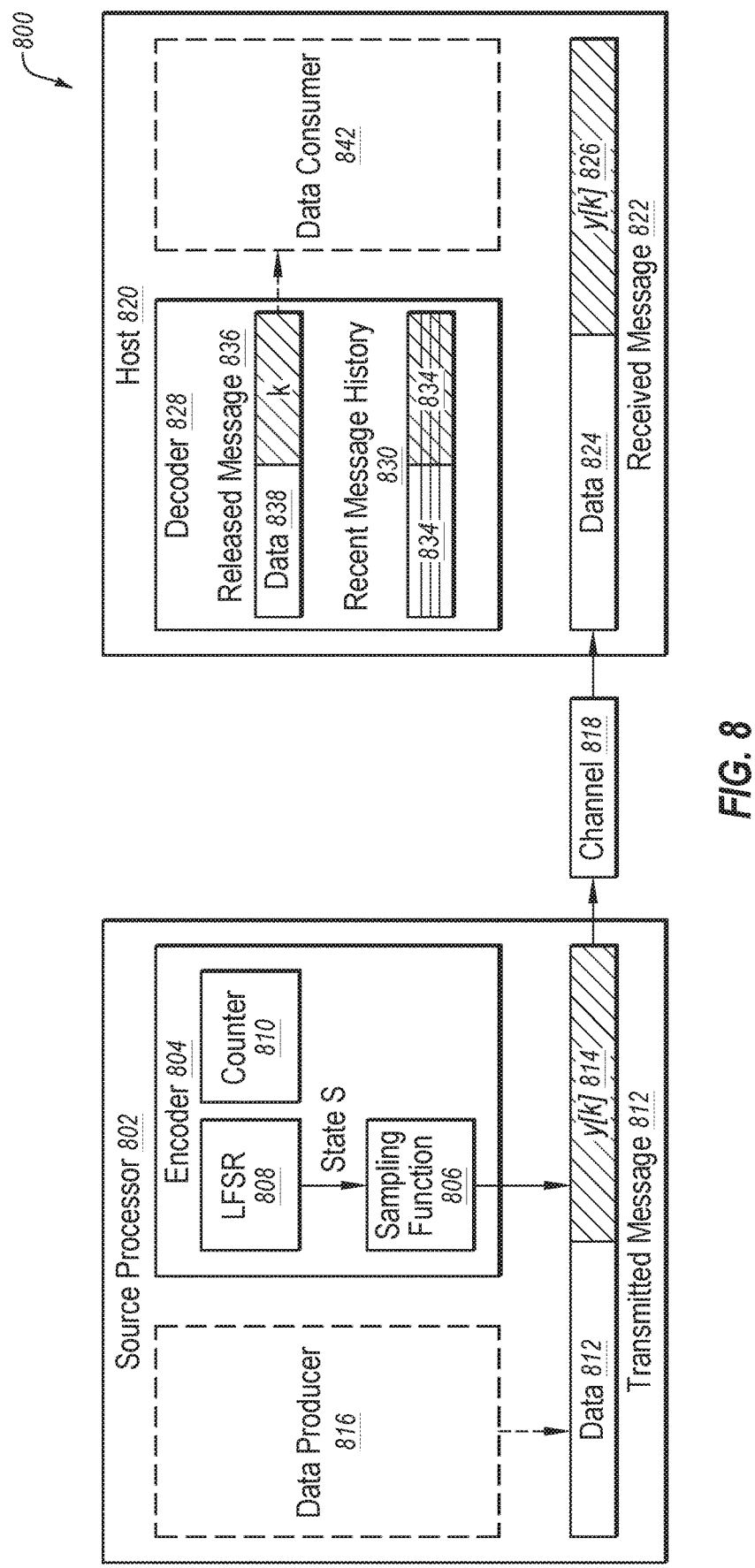
FIG. 8 shows a functional block diagram of a data system, in accordance with one or more embodiments if the disclosure.

FIG. 8 shows a data system 800 in accordance with one or more embodiments of the disclosure. Data system 800 may include a source processor 802 and a host 820, both configured to communicate over channel 818. Source processor 802 may be configured to transmit messages 822 over channel 818. Source processor 802 may be configured to receive data 812 from data producer 816 that is part of, or operatively coupled to, the source processor 802. Source processor 802 may include encoder 804 that is configured for compact timestamping according to one or more embodiments of the disclosure. In one embodiment, encoder 804 may include LFSR 808, counter 810, and sampling function 806. Sampling function 806 may be configured to provide LFSR state samples 814 responsive to states of the LFSR 808. Messages 822 may include data 812 and LFSR state samples 814, for example, in a packetized format.

Host 820 may be configured to receive and consume messages 822. Host 820 may include a decoder 828 configured to recover timing information (e.g., tick count k) responsive to the LFSR state samples 826 in the received messages 822. In one or more embodiments, decoder 828 may include a recent message history 830 that is configured to store received messages 822, in the order received at host 820, including their data 838 and LFSR state samples 834. Upon recovering a tick count 840, one or more received messages 822 may be released. The released messages 836 may include data 838 (which corresponds to the data in the received message) and a tick count 840. In some cases, the released messages 836 may not include a tick count 840, for instance, when decoder 828 fails to recover a tick count from LFSR state samples. Data consumer 842 may be operatively coupled to decoder 828 and configured to receive the released messages 836.

The description of data producer 816 and data consumer 842 is not intended to mean that data system 800 requires either element or that they must exist for there to be literal infringement of the claims.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

On a practical level the software that enables a computer system to perform the operations described herein, may be supplied on any one of a variety of media. Further, the actual implementation of the approach and operations of the invention are actually statements written in a computer language. Such computer language statements, when executed by a computer, cause the computer to act in accordance with the particular content of the statements. Further, the software that enables a computer system to act in accordance with the invention may be provided in any number of forms including, but not limited to, original source code, assembly code, object code, machine language, compressed or encrypted versions of the foregoing, and any and all equivalents.

One of ordinary skill in the art will appreciate that "media," or "computer-readable media," as used here, may include a diskette, a tape, a compact disc, an integrated circuit, a ROM, a CD, DVD, BLU-RAY, a cartridge, flash memory, a memory stick or card, or any other non-destructive storage medium useable by computers, including those now known or hereafter developed.

Although the enabling software might be "written on" a disc, "embodied in" an integrated circuit, "carried over" a communications circuit, "stored in" a memory chip, or "loaded in" a cache memory, it will be appreciated that, for the purposes of this application, the software will be referred to simply as being "in" or "on" the computer readable medium. Thus, the terms "in" or "on" are intended to encompass the above mentioned and all equivalent and possible ways in which software can be associated with a computer readable medium.

For the sake of simplicity, therefore, the term "computer program product" is thus used to refer to a computer readable medium, as defined above, which has on it any form of software to enable a computer system to operate according to any embodiment of the invention.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

Additional non-limiting embodiments of the disclosure include:

Embodiment 1: An encoder for providing timing information for relating groups of data, the encoder comprising: one or more linear feedback shift registers (LFSRs) configured to store N bits of LFSR state information for each of a number of LFSR states, wherein each of the number of LFSR states is associated with timing information; one or more sample output registers configured to store $N_y$ bits of LFSR state sample information for each of a number of LFSR state samples; and one or more samplers configured to reduce N bits of LFSR state information to $N_y$ bits of LFSR state sample information.

Embodiment 2: The encoder of Embodiment 1, wherein the one or more samplers comprise digital logic circuitry configured to: operatively couple sampled register cells of the one or more LFSRs to sample output register cells of the one or more sample output registers, wherein the sampled register cells are a subset of all register cells of the one or more LFSRs; and provide, to the sample output register cells, output bits derived from the bits of the sampled register cells.

Embodiment 3: The encoder of Embodiments 1 and 2, wherein the digital logic circuitry is configured to: perform one or more XOR operations to the bits of the sampled register cells; and provide one or more results of the XOR operations to the sample output register cells.

Embodiment 4: The encoder of Embodiments 1 through 3, wherein the digital logic circuitry is configured to provide the output bits to the sample output register cells responsive to every d updates of the LFSR, wherein d is a sample interval.

Embodiment 5: The encoder of Embodiments 1 through 4, wherein the one or more samplers are configured to provide at least m successive LFSR state samples, wherein $m*N_y>N$ and timing information is recoverable from the at least m successive LFSR state samples.

Embodiment 6: The encoder of Embodiments 1 through 5, wherein the one or more samplers are configured to provide at least m successive LFSR state samples, wherein $m*N_y=N$, and timing information is recoverable from the at least m successive LFSR state samples.

Embodiment 7: The encoder of Embodiments 1 through 6, wherein a sampler of the one or more samplers is configured to reduce N bits of LFSR state information to $N_y$ bits of LFSR state sample information responsive to a sampling matrix.

Embodiment 8: The encoder of Embodiments 1 through 7, wherein a sampler of the one or more samplers is configured to reduce N bits of LFSR state information to $N_y$ bits of LFSR state sample information responsive to at least one bit mask.

Embodiment 9: The encoder of Embodiments 1 through 8, wherein a sampler of the one or more samplers is configured to reduce N bits of LFSR state information to $N_y$ bits of LFSR state sample information responsive to a run-length-encoding (RLE) definition.

Embodiment 10: The encoder of Embodiments 1 through 9, wherein the one or more LFSRs comprise a single LFSR.

Embodiment 11: The encoder of Embodiments 1 through 10, wherein the one or more LFSRs comprise at least a first and a second sampled register cells, the one or more sample output registers comprise at least a first and a second sample output register cells, and the one or more samplers comprises at least a first and a second digital logic circuitry, wherein: the first digital logic circuitry operatively couples the first sampled register cells to the first sample output registers cells; and the second digital logic circuitry operatively couples the second sampled register cells to the second sample output registers cells.

Embodiment 12: The encoder of Embodiments 1 through 11, wherein the one or more samplers are configured to sample the first sampled register cells and the second sampled register cells during the same sample intervals.

Embodiment 13: The encoder of Embodiments 1 through 12, wherein periods of the first and second sampled register cells of the one or more LFSRs are relatively prime.

Embodiment 14: The encoder of Embodiments 1 through 13, wherein the first digital logic circuitry is configured according to a first sampling function and the second digital logic circuitry is configured according to a second sampling function that is different than the first sampling function.

Embodiment 15: The encoder of Embodiments 1 through 14, wherein the one or more sample output registers are operatively coupled to a data bus configured to receive output bits of the one or more sample output registers.

Embodiment 16: The encoder of Embodiments 1 through 15, wherein at least some of the number of LFSR states are associated with a transmission interval of a data transmission system, and at least some of the number of LFSR states samples at the one or more sample output registers are accessible by the data transmission system.

Embodiment 17: The encoder of Embodiments 1 through 16, wherein the received output bits are in a serial bit stream.

Embodiment 18: A method of providing timing information for relating data, the method comprising: changing N bits of linear feedback shift register (LFSR) state responsive to one or more event intervals of a number of event intervals; reducing N bits of LFSR state information to $N_y$ bits of LFSR state sample information responsive to the one or more event intervals, wherein $N_y<N$; and providing LFSR state sample information and event data responsive to the one or more event intervals.

Embodiment 19: The method of Embodiment 18, further comprising skipping at least one event interval of the number of event intervals, wherein the one or more event intervals comprise a first event interval and a second event interval and the at least one event interval is therebetween.

Embodiment 20: The method of Embodiments 18 and 19, wherein skipping at least one event interval comprises skipping a fixed number of event intervals.

Embodiment 21: The method of Embodiments 18 through 20, wherein the one or more event intervals comprises at least two successive event intervals.

Embodiment 22: The method of Embodiments 18 through 21, wherein providing the LFSR state sample information and event data comprises transmitting the LFSR state sample information and event data.

Embodiment 23: The method of Embodiments 18 through 22, wherein providing the LFSR state sample information and event data comprises storing LFSR state sample information and data at a record.

Embodiment 24: The method of Embodiments 18 through 23, further comprising providing at least m successive LFSR state samples, wherein $m*N_y>N$ and timing information is recoverable from the at least m successive LFSR state samples.

Embodiment 25: The method of Embodiments 18 through 24, further comprising providing at least m successive LFSR state samples, wherein $m*N_y=N$, and timing information is recoverable from the at least m successive LFSR state samples.

Embodiment 26: The method of Embodiments 18 through 25, further comprising reducing the N bits of LFSR state information to the $N_y$ bits of LFSR state sample information responsive to a sampling matrix.

Embodiment 27: The method of Embodiments 18 through 26, further comprising reducing the N bits of LFSR state information to the $N_y$ bits of LFSR state sample information by: masking at least some of the N-bits of LFSR state information responsive to one or more bit masks; and combining un-masked bits of the N-bits of LFSR state information responsive to each masking of the at least some of the N-bits of LFSR state information.

Embodiment 28: The method of Embodiments 18 through 27, wherein combining un-masked bits of the N-bits of LFSR state information comprises selecting an un-masked bit of the N-bits of LFSR state information responsive to only one bit of LFSR state information being un-masked.

Embodiment 29: The method of Embodiments 18 through 28, wherein combining un-masked bits of the N-bits of LFSR state information comprises performing one or more XOR operations to the un-masked bits of the N-bits of LFSR state information.

Embodiment 30: The method of Embodiments 18 through 29, further comprising reducing the N bits of LFSR state information to the $N_y$ bits of LFSR state sample information responsive to a run-length-encoding (RLE) definition.

Embodiment 31: A method of providing timing information for relating data, the method comprising: changing $N_1$ bits of first linear feedback shift register (LFSR) state and $N_2$ bits of second LFSR state responsive to one or more event intervals of a number of event intervals; reducing $N_1$ bits of LFSR state information to $N_{y1}$ bits of LFSR state sample information and reducing $N_2$ bits of LFSR state information to $N_{y2}$ bits of LFSR state sample information, responsive to the one or more event intervals, wherein $N_{y1}<N_1$ and $N_{y2}<N_2$; and providing one or more LFSR state samples of reduced LFSR state information, responsive to the one or more event intervals.

Embodiment 32: The method of Embodiment 31, further comprising skipping at least one event interval of the number of event intervals, wherein the one or more event intervals comprise a first event interval and a second event interval and the at least one event interval is therebetween.

Embodiment 33: The method of Embodiments 31 and 32, wherein the one or more event intervals comprises at least two successive event intervals.

Embodiment 34: The method of Embodiments 31 through 33, wherein providing the timing information comprises transmitting the one or more LFSR state samples and data.

Embodiment 35: The method of Embodiments 31 through 34, wherein providing the timing information comprises storing, at a data log, the one or more LFSR state samples and data.

Embodiment 36: The method of Embodiments 31 through 35, further comprising sampling the $N_1$ bits of LFSR state and the $N_2$ bits of LFSR state during a same event interval.

Embodiment 37: The method of Embodiments 31 through 36, further comprising reducing the $N_{y1}$ bits of LFSR state information and the $N_{y2}$ bits of LFSR state information during different event intervals of the number of event intervals.

Embodiment 38: The method of Embodiments 31 through 37, further comprising: providing, to the one or more first sample output registers, one or more first output bits derived from the $N_{y1}$ sampled bits; and providing, to the one or more second sample output registers, one or more second output bits derived from the $N_{y2}$ sampled bits.

Embodiment 39: The method of Embodiments 31 through 38, further comprising modifying the $N_{y1}$ sampled bits according to a first sampling function and modifying the $N_{y2}$ sampled bits according to a second sampling function, wherein the first sampling function is different than the second sampling function.

Embodiment 40: A decoder for recovering timing information for relating data, the decoder comprising: a memory configured to store event reports associated with a number of event intervals, each of the event reports comprising at least data and $N_y$ bit timing data; a processor configured to: recover an N bit timing data responsive to a number m of $N_y$ bit timing data, wherein $N_y$ is <N; and determining timing information responsive to the recovered N bit timing data.

Embodiment 41: The decoder of Embodiment 40, wherein the event report is an event record, and the event interval is associated with an operation of an embedded system or a time period of operation of the embedded system.

Embodiment 42: The decoder of Embodiments 40 and 41, wherein the event report is a message, and the event interval is a data transmission interval.

Embodiment 43: The decoder of Embodiments 40 through 42, wherein the processor is configured to recover the N bit timing data and determine the timing information responsive to a priori information about a reporting system generating the event reports.

Embodiment 44: The decoder of Embodiments 40 through 43, wherein the processor is further configured to use more or less a priori information responsive to a confidence that the reporting system is operating according to the a priori information.

Embodiment 45: The decoder of Embodiments 40 through 44, wherein the processor is configured to perform confidence increasing operations selected to increase the confidence that the reporting system is operating according to the a priori information.

Embodiment 46: The decoder of Embodiments 40 through 45, wherein the confidence increasing operations comprise using one or more confidence timing data in addition to the number m of $N_y$ bit timing data.

Embodiment 47: The decoder of Embodiments 40 through 46, wherein the confidence increasing operations comprise using a stored $N_y$ bit timing data and replacing at least one $N_y$ bit timing data of the number m of $N_y$ bit timing data with a stored $N_y$ bit timing data.

Embodiment 48: The decoder of Embodiments 40 through 47, wherein the processor is configured to discard at least some of the received $N_y$ bit timing data responsive to failing to increase the confidence that the reporting system is operating according to the a priori information within a defined period.

Embodiment 49: The decoder of Embodiments 40 through 48, wherein the processor is configured to determine timing information responsive to a discrete logarithm and a number of received $N_y$ bit timing data.

Embodiment 50: The decoder of Embodiments 40 through 49, wherein the processor is configured to provide a released report to a data consumer, the released report comprising a data of a received report and timing information corresponding to the $N_y$ bit timing data of the received report.

Embodiment 51: The decoder of Embodiments 40 through 50, wherein the a priori information comprises one or more of redundancy, reporting interval, past history, and combinations thereof.

Embodiment 52: The decoder of Embodiments 40 through 51, wherein past history comprises previously received timing data.

Embodiment 53: The decoder of Embodiments 40 through 52, wherein the memory is configured to store one or more event log files that include the event reports.

Embodiment 54: The decoder of Embodiments 40 through 53, further comprising a communication interface configured to receive messages, wherein the messages comprise the event reports.

Embodiment 55: A method of recovering timing information for relating data, the method comprising: receiving and storing event reports, each of the event reports comprising data and $N_y$ bit timing data; recovering at least one N bit timing data responsive to a number m of $N_y$ bit timing data, wherein $N>N_y$; and determining timing information responsive to the recovered N bit timing data.

Embodiment 56: The method of Embodiment 55, wherein receiving and storing event reports comprises retrieving records from event log files, the records associated with an operation of embedded system or a time period of operation of the embedded system.

Embodiment 57: The method of Embodiments 55 and 56, wherein receiving and storing event reports comprises receiving and storing messages received over a data transmission.

Embodiment 58: The method of Embodiments 55 through 57, further comprising recovering the at least one N bit timing data and determining at least one timing information responsive to a priori information about a data transmission system.

Embodiment 59: The method of Embodiments 55 through 58, further comprising using more or less a priori knowledge about the data transmission system responsive to confidence that the data transmission system is operating according to the a priori information.

Embodiment 60: The method of Embodiments 55 through 59, further comprising performing confidence increasing operations selected to increase the confidence associated with the data transmission.

Embodiment 61: The method of Embodiments 55 through 60, further comprising performing the confidence increasing operations using one or more confidence timing data in addition to the number m of $N_y$ bit timing data.

Embodiment 62: The method of Embodiments 55 through 61, wherein performing the confidence increasing operations comprises: matching at least one received $N_y$ bit timing data and a pre-calculated $N_y$ bit timing data; and selecting a pre-calculated N bit timing data associated with the pre-calculated $N_y$ bit timing data.

Embodiment 63: The method of Embodiments 55 through 62, further comprising discarding at least some of the received $N_y$ bit timing data associated upon failing to increase the confidence that the data transmission system is operating according to the a priori information within a defined period.

Embodiment 64: The method of Embodiments 55 through 63, further comprising determining timing information responsive to a discrete logarithm and a number of received $N_y$ bit timing data.

Embodiment 65: The method of Embodiments 55 through 64, further comprising providing a released message to a data consumer, the released messages comprising a data payload of a received message and timing information corresponding to the $N_y$ bit timing data of the received message.

Embodiment 66: A method for relating monitoring data about a monitored system with system data from the monitored system, the method comprising: receiving system data messages, each system data message comprising system data and first timing data; receiving monitoring data messages, each monitoring data message comprising monitoring data and second timing data; recovering first timing information responsive to first timing data received in one or more system data messages of the received system data messages; recovering second timing information responsive to second timing data received in one or more monitoring data messages of the received monitoring data messages; and relating at least one system data and at least one monitoring data responsive to the first timing information and the second timing information.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

I claim:

1. An encoder, comprising:
one or more linear feedback shift registers (LFSRs) configured to store N bits of LFSR state information for each of a number of LFSR states;
one or more sample output registers configured to store $N_y$ bits of LFSR state sample information for each of a number of LFSR state samples; and
one or more samplers comprising digital logic circuitry configured to:
operatively couple sampled register cells of the one or more LFSRs to sample output register cells of the one or more sample output registers, wherein the sampled register cells are a subset of all register cells of the one or more LFSRs; and
provide, to the sample output register cells, output bits derived from the bits of the sampled register cells.

2. The encoder of claim 1, wherein the digital logic circuitry is configured to:
perform one or more XOR operations to the bits of the sampled register cells; and
provide one or more results of the XOR operations to the sample output register cells.

3. The encoder of claim 1, wherein the digital logic circuitry is configured to provide the output bits to the sample output register cells responsive to every d updates of the LFSR, wherein d is a sample interval.

4. The encoder of claim 1, wherein the one or more samplers are configured to provide at least m successive LFSR state samples, wherein $m*N_y>N$ and timing information is recoverable from the at least m successive LFSR state samples.

5. The encoder of claim 1, wherein the one or more samplers are configured to provide at least m successive LFSR state samples, wherein $m*N_y=N$, and timing information is recoverable from the at least m successive LFSR state samples.

6. The encoder of claim 1, wherein a sampler of the one or more samplers is configured to reduce N bits of LFSR state information to $N_y$ bits of LFSR state sample information responsive to a sampling matrix.

7. The encoder of claim 1, wherein a sampler of the one or more samplers is configured to reduce N bits of LFSR state information to $N_y$ bits of LFSR state sample information responsive to at least one bit mask.

8. The encoder of claim 1, wherein a sampler of the one or more samplers is configured to reduce N bits of LFSR state information to $N_y$ bits of LFSR state sample information responsive to a run-length-encoding (RLE) definition.

9. The encoder of claim 1, wherein the one or more LFSRs comprise a single LFSR.

10. An encoder, comprising:
one or more linear feedback shift registers (LFSRs) configured to store N bits of LFSR state information for each of a number of LFSR states;
one or more sample output registers configured to store $N_y$ bits of LFSR state sample information for each of a number of LFSR state samples; and
one or more samplers configured to reduce N bits of LFSR state information to $N_y$ bits of LFSR state sample information,
wherein the one or more LFSRs comprise at least a first and a second sampled register cells, the one or more sample output registers comprise at least a first and a second sample output register cells, and the one or more samplers comprises at least a first and a second digital logic circuitry, wherein:
the first digital logic circuitry operatively couples the first sampled register cells to the first sample output registers cells; and
the second digital logic circuitry operatively couples the second sampled register cells to the second sample output registers cells.

11. The encoder of claim 10, wherein the one or more samplers are configured to sample the first sampled register cells and the second sampled register cells during the same sample intervals.

12. The encoder of claim 10, wherein periods of the first and second sampled register cells of the one or more LFSRs are relatively prime.

13. The encoder of claim 10, wherein the first digital logic circuitry is configured according to a first sampling function and the second digital logic circuitry is configured according to a second sampling function that is different than the first sampling function.

14. An encoder, comprising:
one or more linear feedback shift registers (LFSRs) configured to store N bits of LFSR state information for each of a number of LFSR states;
one or more sample output registers configured to store $N_y$ bits of LFSR state sample information for each of a number of LFSR state samples; and
one or more samplers configured to reduce N bits of LFSR state information to $N_y$ bits of LFSR state sample information,
wherein the one or more sample output registers are operatively coupled to a data bus configured to receive a serial bit stream of output bits of the one or more sample output registers.

15. The encoder of claim 14, wherein at least some of the number of LFSR states are associated with a transmission interval of a data transmission system, and at least some of the number of LFSR states samples at the one or more sample output registers are accessible by the data transmission system.

16. A method of providing timing information for relating data, the method comprising:
changing N bits of linear feedback shift register (LFSR) state responsive to one or more event intervals of a number of event intervals;
reducing N bits of LFSR state information to $N_y$ bits of LFSR state sample information responsive to the one or more event intervals, wherein $N_y<N$; and
providing LFSR state sample information and event data responsive to the one or more event intervals.

17. The method of claim 16, further comprising skipping at least one event interval of the number of event intervals, wherein the one or more event intervals comprise a first event interval and a second event interval and the at least one event interval is therebetween.

18. The method of claim 17, wherein skipping at least one event interval comprises skipping a fixed number of event intervals.

19. The method of claim 16, wherein the one or more event intervals comprises at least two successive event intervals.

20. The method of claim 16, wherein providing the LFSR state sample information and event data comprises transmitting the LFSR state sample information and event data.

21. The method of claim 16, wherein providing the LFSR state sample information and event data comprises storing LFSR state sample information and data at a record.

22. The method of claim 16, further comprising providing at least m successive LFSR state samples, wherein $m*N_y>N$ and timing information is recoverable from the at least m successive LFSR state samples.

23. The method of claim 16, further comprising providing at least m successive LFSR state samples, wherein $m*N_y=N$, and timing information is recoverable from the at least m successive LFSR state samples.

24. The method of claim 16, further comprising reducing the N bits of LFSR state information to the $N_y$ bits of LFSR state sample information responsive to a sampling matrix.

25. The method of claim 16, further comprising reducing the N bits of LFSR state information to the $N_y$ bits of LFSR state sample information by:
masking at least some of the N-bits of LFSR state information responsive to one or more bit masks; and combining un-masked bits of the N-bits of LFSR state information responsive to each masking of the at least some of the N-bits of LFSR state information.

26. The method of claim 25, wherein combining un-masked bits of the N-bits of LFSR state information comprises selecting an un-masked bit of the N-bits of LFSR state information responsive to only one bit of LFSR state information being un-masked.

27. The method of claim 25, wherein combining un-masked bits of the N-bits of LFSR state information comprises performing one or more XOR operations to the un-masked bits of the N-bits of LFSR state information.

28. The method of claim 16, further comprising reducing the N bits of LFSR state information to the $N_y$ bits of LFSR state sample information responsive to a run-length-encoding (RLE) definition.

29. A method of providing timing information for relating data, the method comprising:
  changing $N_1$ bits of first linear feedback shift register (LFSR) state and $N_2$ bits of second LFSR state responsive to one or more event intervals of a number of event intervals;
  reducing $N_1$ bits of LFSR state information to $N_{y1}$ bits of LFSR state sample information and reducing $N_2$ bits of LFSR state information to $N_{y2}$ bits of LFSR state sample information, responsive to the one or more event intervals, wherein $N_{y1} < N_1$ and $N_{y2} < N_2$; and
  providing one or more LFSR state samples of reduced LFSR state information, responsive to the one or more event intervals.

30. The method of claim 29, further comprising skipping at least one event interval of the number of event intervals, wherein the one or more event intervals comprise a first event interval and a second event interval and the at least one event interval is therebetween.

31. The method of claim 29, wherein the one or more event intervals comprises at least two successive event intervals.

32. The method of claim 29, wherein providing the timing information comprises transmitting the one or more LFSR state samples and data.

33. The method of claim 29, wherein providing the timing information comprises storing, at a data log, the one or more LFSR state samples and data.

34. The method of claim 29, further comprising sampling the $N_1$ bits of LFSR state and the $N_2$ bits of LFSR state during a same event interval.

35. The method of claim 29, further comprising reducing the $N_{y1}$ bits of LFSR state information and the $N_{y2}$ bits of LFSR state information during different event intervals of the number of event intervals.

36. The method of claim 29, further comprising:
  providing, to the one or more first sample output registers, one or more first output bits derived from the $N_{y1}$ sampled bits; and
  providing, to the one or more second sample output registers, one or more second output bits derived from the $N_{y2}$ sampled bits.

37. The method of claim 29, further comprising modifying the $N_{y1}$ sampled bits according to a first sampling function and modifying the $N_{y2}$ sampled bits according to a second sampling function, wherein the first sampling function is different than the second sampling function.

\* \* \* \* \*

UNITED STATES PATENT AND TRADEMARK OFFICE
CERTIFICATE OF CORRECTION

PATENT NO. : 11,082,544 B2
APPLICATION NO. : 16/169501
DATED : August 3, 2021
INVENTOR(S) : Jason Sachs Page 1 of 1

It is certified that error appears in the above-identified patent and that said Letters Patent is hereby corrected as shown below:

In the Specification
Column 9, Line 40, change "(S[$k$+3c/], $k$+3$d$)" to --(S[$k$+3$d$], $k$+3$d$)--
Column 9, Line 60, change "y[k]ly[k-d]ly[k-2d]" to --y[k]|y[k-d]|y[k-2d]--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*